(12) United States Patent
Cui et al.

(10) Patent No.: US 11,909,532 B2
(45) Date of Patent: Feb. 20, 2024

(54) REDUNDANCY GAP INDICATION FOR IMPROVED DATA TRANSMISSION

(71) Applicant: Apple Inc., Cupertino, CA (US)

(72) Inventors: Jie Cui, San Jose, CA (US); Weidong Yang, San Diego, CA (US); Yuchul Kim, San Jose, CA (US); Hong He, San Jose, CA (US); Chunxuan Ye, San Diego, CA (US); Wei Zeng, Saratoga, CA (US); Dawei Zhang, Saratoga, CA (US); Chunhai Yao, Beijing (CN); Oghenekome Oteri, San Diego, CA (US); Yushu Zhang, Beijing (CN); Yang Tang, San Jose, CA (US); Ismael Gutierrez Gonzalez, San Jose, CA (US); Haitong Sun, Cupertino, CA (US); Ziyang Ju, Muenchen (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,003

(22) PCT Filed: Apr. 8, 2020

(86) PCT No.: PCT/CN2020/083783
§ 371 (c)(1),
(2) Date: Sep. 20, 2021

(87) PCT Pub. No.: WO2021/203308
PCT Pub. Date: Oct. 14, 2021

(65) Prior Publication Data
US 2023/0028029 A1    Jan. 26, 2023

(51) Int. Cl.
*H04W 72/04*    (2023.01)
*H04L 1/1812*   (2023.01)
*H04L 1/1607*   (2023.01)

(52) U.S. Cl.
CPC .......... *H04L 1/1819* (2013.01); *H04L 1/1671* (2013.01)

(58) Field of Classification Search
CPC ... H04L 1/1819; H04L 1/1671; H04L 1/0026; H04L 5/0044; H04L 5/0055
See application file for complete search history.

(56) References Cited

U.S. PATENT DOCUMENTS 11,664,934 B2*  5/2023  Yu ................... H04L 1/1845
                                                        370/316
2003/0079170 A1*  4/2003  Stewart ............. H04L 1/1819
                                                        714/790
(Continued)

FOREIGN PATENT DOCUMENTS

| CN | 102412947 A | 4/2012 |
| CN | 103384193 A | 6/2013 |
| CN | 103378936 A | 10/2013 |

OTHER PUBLICATIONS

PCT Search Report dated Dec. 17, 2020 in connection with PCT Application No. PCT/CN2020/083783.
(Continued)

*Primary Examiner* — Mahbubul Bar Chowdhury
(74) *Attorney, Agent, or Firm* — Eschweiler & Potashnik, LLC

(57) ABSTRACT

Techniques discussed herein can facilitate successful decoding of Physical Downlink Shared Channel (PDSCH) based on a reduced number of retransmissions. Based on a given PDSCH, embodiments discussed herein can communicate feedback (e.g., Hybrid Automatic Repeat reQuest (HARQ) feedback, Channel State Information (CSI) feedback) that indicates an amount of additional information that can allow a User Equipment (UE) to successfully decode the PDSCH. In some embodiments, the feedback can indicate a requested Redundancy Version (RV) sequence that can allow the UE to
(Continued)

successfully decode the PDSCH. In other embodiments, the feedback can indicate the amount of additional information, based on which a receiving Base Station (BS) can select a RV sequence.

20 Claims, 16 Drawing Sheets

(56) References Cited

U.S. PATENT DOCUMENTS

| | | | | |
|---|---|---|---|---|
| 2008/0090517 A1* | 4/2008 | Cheng | ............... | H04L 1/1825 455/39 |
| 2015/0333876 A1* | 11/2015 | Svedman | ............ | H04L 1/1896 370/242 |
| 2018/0019855 A1* | 1/2018 | Zhang | ............... | H04L 1/00 |
| 2018/0375616 A1* | 12/2018 | Beale | ............... | H04L 1/1816 |
| 2019/0349116 A1 | 11/2019 | Hosseini et al. | | |
| 2020/0244406 A1* | 7/2020 | Lee | ............... | H04L 5/001 |
| 2021/0167897 A1* | 6/2021 | Seidel | ............... | H04L 1/1864 |
| 2021/0391958 A1* | 12/2021 | Yu | ............... | H04L 1/1607 |

OTHER PUBLICATIONS

PCT Written Opinion dated Dec. 17, 2020 in connection with PCT Application No. PCT/CN2020/083783.
AT&T; "On Potential Enhancements to PDCCH for UROLLC"; 3GPP TSG RAN WG1; Meeting #95; R1-1812853; Nov. 16, 2018.
3rd Generation Partnership Project; Technical Specification Group Radio Access Network; Study on physical layer enhancements for NR ultra-reliable and low latency case (URLLC); (Release 16); 3GPP TR 38.824 V16.0.0; Mar. 2019.

* cited by examiner

REDUNDANCY GAP INDICATION FOR IMPROVED DATA TRANSMISSION

REFERENCE TO RELATED APPLICATIONS

This application is a National Phase entry application of International Patent Application No. PCT/CN2020/083783 filed Apr. 8, 2020, entitled "REDUNDANCY GAP INDICATION FOR IMPROVED DATA TRANSMISSION", the contents of which are herein incorporated by reference in their entirety.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

DETAILED DESCRIPTION

Figure 1:
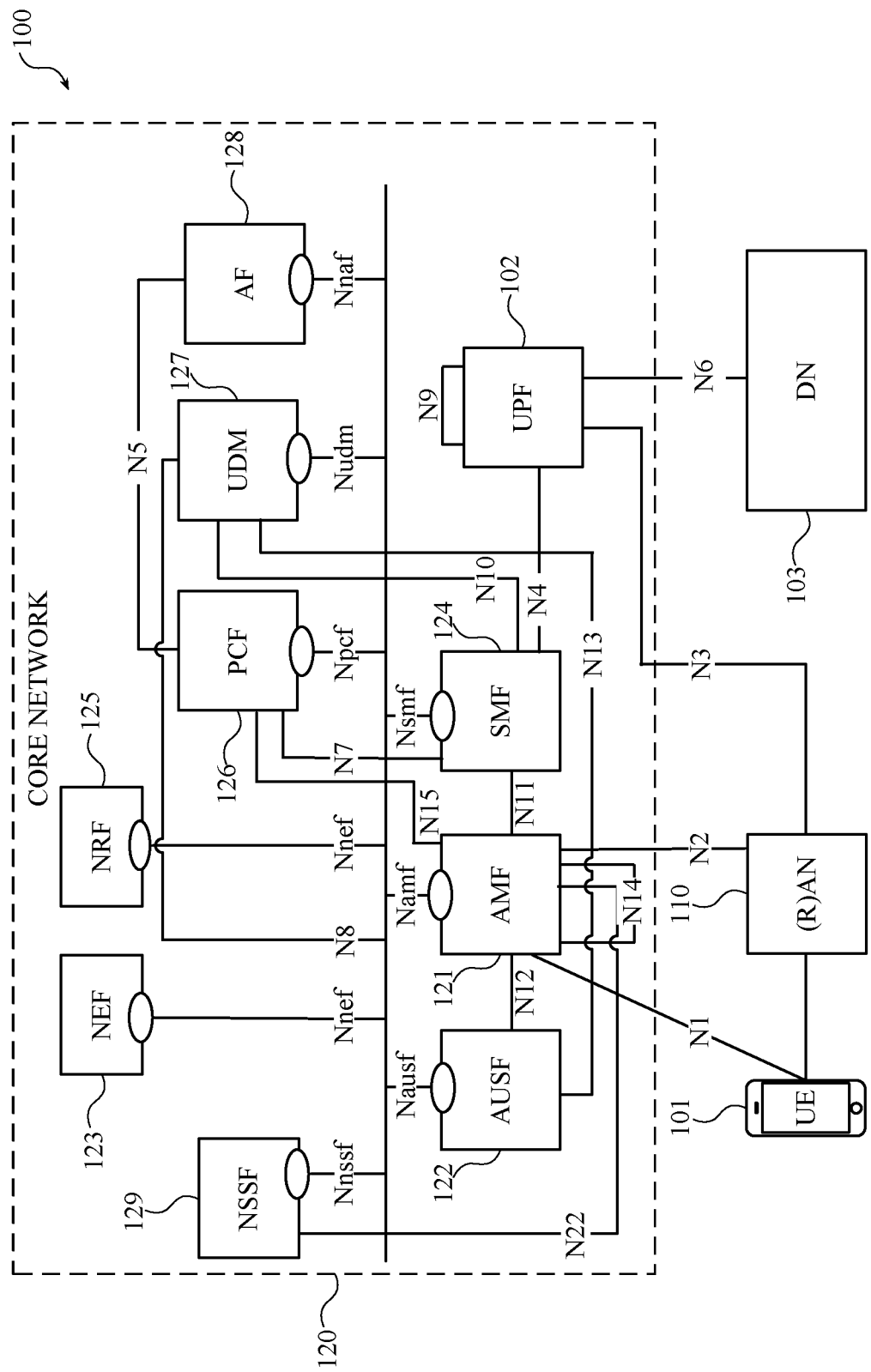
FIG. 1 is a block diagram illustrating an architecture of a system including a Core Network (CN), for example a Fifth Generation (5G) CN (5GC), in accordance with various embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to communicate via a 3GPP RAN, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more," unless the context indicates otherwise (e.g., "the empty set," "a set of two or more Xs," etc.).

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments described herein can be implemented into a system using any suitably configured hardware and/or software. FIG. 1 illustrates an architecture of a system 100 including a Core Network (CN) 120, for example a Fifth Generation (5G) CN (5GC), in accordance with various embodiments. The system 100 is shown to include a UE 101, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes (e.g., Evolved Node B(s) (eNB(s)), next generation Node B(s) (gNB(s), and/or other nodes) or other nodes or access points; and a Data Network (DN) 203, which can be, for example, operator services, Internet access or third party services; and a Fifth Generation Core Network (5GC) 120. The 5GC 120 can comprise one or more of the following functions and network components: an Authentication Server Function (AUSF) 122; an Access and Mobility Management Function (AMF) 121; a Session Management Function (SMF) 124; a Network Exposure Function (NEF) 123; a Policy Control Function (PCF) 126; a Network Repository Function (NRF) 125; a Unified Data Management (UDM) 127; an Application Function (AF) 128; a User Plane (UP) Function (UPF) 102; and a Network Slice Selection Function (NSSF) 129.

The UPF 102 can act as an anchor point for intra-RAT and inter-RAT mobility, an external Protocol Data Unit (PDU) session point of interconnect to DN 103, and a branching point to support multi-homed PDU session. The UPF 102 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AUSF 122 can facilitate a common authentication framework for various access types. The AUSF 122 can communicate with the AMF 121 via an N12 reference point between the AMF 121 and the AUSF 122; and can communicate with the UDM 127 via an N13 reference point between the UDM 127 and the AUSF 122. Additionally, the AUSF 122 can exhibit an Nausf service-based interface.

The AMF 121 can be responsible for registration management (e.g., for registering UE 101, etc.), connection management, reachability management, mobility management, and lawful interception of AMF-related events, and access authentication and authorization. The AMF 121 can be a termination point for the an N11 reference point between the AMF 121 and the SMF 124. The AMF 121 can provide transport for SM messages between the UE 101 and the SMF 124, and act as a transparent proxy for routing SM messages. AMF 121 can also provide transport for SMS messages between UE 101 and a Short Message Service (SMS) Function (SMSF) (not shown in FIG. 1). AMF 121 can act as SEcurity Anchor Function (SEAF), which can include interaction with the AUSF 122 and the UE 101 and/or receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Single-Connection Mode (SCM) function, which receives a key from the SEA that it uses to derive access-network specific keys. Furthermore, AMF 121 can be a termination point of a RAN Control Plane (CP) interface, which can include or be an N2 reference point between the (R)AN 110 and the AMF 121; and the AMF 121 can be a termination point of Non Access Stratum (NAS) (N1) signaling, and perform NAS ciphering and integrity protection.

AMF 121 can also support NAS signaling with a UE 101 over an Non-3GPP (N3) Inter Working Function (IWF) interface. The N3IWF can be used to provide access to untrusted entities. N3IWF can be a termination point for the N2 interface between the (R)AN 110 and the AMF 121 for the control plane, and can be a termination point for the N3 reference point between the (R)AN 110 and the UPF 102 for the user plane. As such, the AMF 121 can handle N2 signaling from the SMF 124 and the AMF 121 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit an Namf service-based interface, and can be a termination point for an N14 reference point between two AMFs 121 and an N17 reference point between the AMF 121 and a 5G Equipment Identity Register (5G-EIR) (not shown in FIG. 1).

The UE 101 can be registered with the AMF 121 in order to receive network services. Registration Management (RM) is used to register or deregister the UE 101 with the network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 holds no valid location or routing information for the UE 101 so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

The AMF 121 can store one or more RM contexts for the UE 101, where each RM context is associated with a specific access to the network. The RM context can be a data structure, database object, etc. that indicates or stores, inter alia, a registration state per access type and the periodic update timer. The AMF 121 can also store a 5GC Mobility Management (MM) context that can be the same or similar to an (Enhanced Packet System (EPS))MM ((E)MM) context. In various embodiments, the AMF 121 can store a Coverage Enhancement (CE) mode B Restriction parameter of the UE 101 in an associated MM context or RM context. The AMF 121 can also derive the value, when needed, from the UE's usage setting parameter already stored in the UE context (and/or MM/RM context).

Connection Management (CM) can be used to establish and release a signaling connection between the UE 101 and the AMF 121 over the N1 interface. The signaling connection is used to enable NAS signaling exchange between the UE 101 and the CN 120, and comprises both the signaling connection between the UE and the AN (e.g., RRC connection or UE-N31WF connection for non-3GPP access) and the N2 connection for the UE 101 between the AN (e.g., RAN 110) and the AMF 121. The UE 101 can operate in one of two CM states, CM-IDLE mode or CM-CONNECTED mode. When the UE 101 is operating in the CM-IDLE state/mode, the UE 101 may have no NAS signaling connection established with the AMF 121 over the N1 interface, and there can be (R)AN 110 signaling connection (e.g., N2 and/or N3 connections) for the UE 101. When the UE 101 is operating in the CM-CONNECTED state/mode, the UE 101 can have an established NAS signaling connection with the AMF 121 over the N1 interface, and there can be a (R)AN 110 signaling connection (e.g., N2 and/or N3 connections) for the UE 101. Establishment of an N2 connection between the (R)AN 110 and the AMF 121 can cause the UE 101 to transition from CM-IDLE mode to CM-CONNECTED mode, and the UE 101 can transition from the CM-CONNECTED mode to the CM-IDLE mode when N2 signaling between the (R)AN 110 and the AMF 121 is released.

The SMF 124 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 120 request, and released upon UE 101 and 5GC 120 request using NAS SM signaling exchanged over the N1 reference point between the UE 101 and the SMF 124. Upon request from an application server, the 5GC 120 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The SMF 124 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 124 can be included in the system 100, which can be between another SMF 124 in a visited network and the SMF 124 in the home network in roaming scenarios. Additionally, the SMF 124 can exhibit the Nsmf service-based interface.

The NEF 123 can provide means for securely exposing the services and capabilities provided by 3GPP network functions for third party, internal exposure/re-exposure, Application Functions (e.g., AF 128), edge computing or fog computing systems, etc. In such embodiments, the NEF 123 can authenticate, authorize, and/or throttle the AFs. NEF 123 can also translate information exchanged with the AF 128 and information exchanged with internal network functions. For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, and/or used for other purposes such as analytics. Additionally, the NEF 123 can exhibit an Nnef service-based interface.

The NRF 125 can support service discovery functions, receive NF discovery requests from NF instances, and provide the information of the discovered NF instances to the NF instances. NRF 125 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 125 can exhibit the Nnrf service-based interface.

The PCF 126 can provide policy rules to control plane function(s) to enforce them, and can also support unified policy framework to govern network behavior. The PCF 126 can also implement an FE to access subscription information relevant for policy decisions in a UDR of the UDM 127. The PCF 126 can communicate with the AMF 121 via an N15 reference point between the PCF 126 and the AMF 121, which can include a PCF 126 in a visited network and the AMF 121 in case of roaming scenarios. The PCF 126 can communicate with the AF 128 via an N5 reference point between the PCF 126 and the AF 128; and with the SMF 124 via an N7 reference point between the PCF 126 and the SMF 124. The system 100 and/or CN 120 can also include an N24 reference point between the PCF 126 (in the home network) and a PCF 126 in a visited network. Additionally, the PCF 126 can exhibit an Npcf service-based interface.

The UDM 127 can handle subscription-related information to support the network entities' handling of communication sessions, and can store subscription data of UE 101. For example, subscription data can be communicated between the UDM 127 and the AMF 121 via an N8 reference point between the UDM 127 and the AMF. The UDM 127 can include two parts, an application Functional Entity (FE) and a Unified Data Repository (UDR) (the FE and UDR are not shown in FIG. 1). The UDR can store subscription data and policy data for the UDM 127 and the PCF 126, and/or structured data for exposure and application data (including Packet Flow Descriptions (PFDs) for application detection, application request information for multiple UEs 101) for the NEF 123. The Nudr service-based interface can be exhibited by the UDR 221 to allow the UDM 127, PCF 126, and NEF 123 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 124 via an N10 reference point between the UDM 127 and the SMF 124. UDM 127 can also support SMS management, wherein an SMS-FE implements similar application logic as discussed elsewhere herein. Additionally, the UDM 127 can exhibit the Nudm service-based interface.

The AF 128 can provide application influence on traffic routing, provide access to NEF 123, and interact with the policy framework for policy control. 5GC 120 and AF 128 can provide information to each other via NEF 123, which can be used for edge computing implementations. In such implementations, the network operator and third party services can be hosted close to the UE 101 access point of attachment to achieve an efficient service delivery through the reduced end-to-end latency and load on the transport network. For edge computing implementations, the 5GC can select a UPF 102 close to the UE 101 and execute traffic steering from the UPF 102 to DN 103 via the N6 interface. This can be based on the UE subscription data, UE location, and information provided by the AF 128. In this way, the AF 128 can influence UPF (re)selection and traffic routing. Based on operator deployment, when AF 128 is considered to be a trusted entity, the network operator can permit AF 128 to interact directly with relevant NFs. Additionally, the AF 128 can exhibit an Naf service-based interface.

The NSSF 129 can select a set of network slice instances serving the UE 101. The NSSF 129 can also determine allowed Network Slice Selection Assistance Information (NSSAI) and the mapping to the subscribed Single NSSAIs (S-NSSAIs), as appropriate. The NSSF 129 can also determine the AMF set to be used to serve the UE 101, or a list of candidate AMF(s) 121 based on a suitable configuration and possibly by querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N22 reference point between AMF 121 and NSSF 129; and can communicate with another NSSF 129 in a visited network via an N31 reference point (not shown in FIG. 1). Additionally, the NSSF 129 can exhibit an Nnssf service-based interface.

As discussed previously, the CN 120 can include an SMSF, which can be responsible for SMS subscription checking and verification, and relaying SM messages to/from the UE 101 to/from other entities, such as an SMS-Gateway Mobile services Switching Center (GMSC)/Inter-Working MSC (IWMSC)/SMS-router. The SMSF can also interact with AMF 121 and UDM 127 for a notification procedure that the UE 101 is available for SMS transfer (e.g., set a UE not reachable flag, and notifying UDM 127 when UE 101 is available for SMS).

The CN 120 can also include other elements that are not shown in FIG. 1, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 1). Individual NFs can share a UDSF for storing their respective unstructured data or individual NFs can each have their own UDSF located at or near the individual NFs. Additionally, the UDSF can exhibit an Nudsf service-based interface (not shown in FIG. 1). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 1 for clarity. In one example, the CN 120 can include an Nx interface, which is an inter-CN interface between the MME (e.g., a non-5G MME) and the AMF 121 in order to enable interworking between CN 120 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 2:
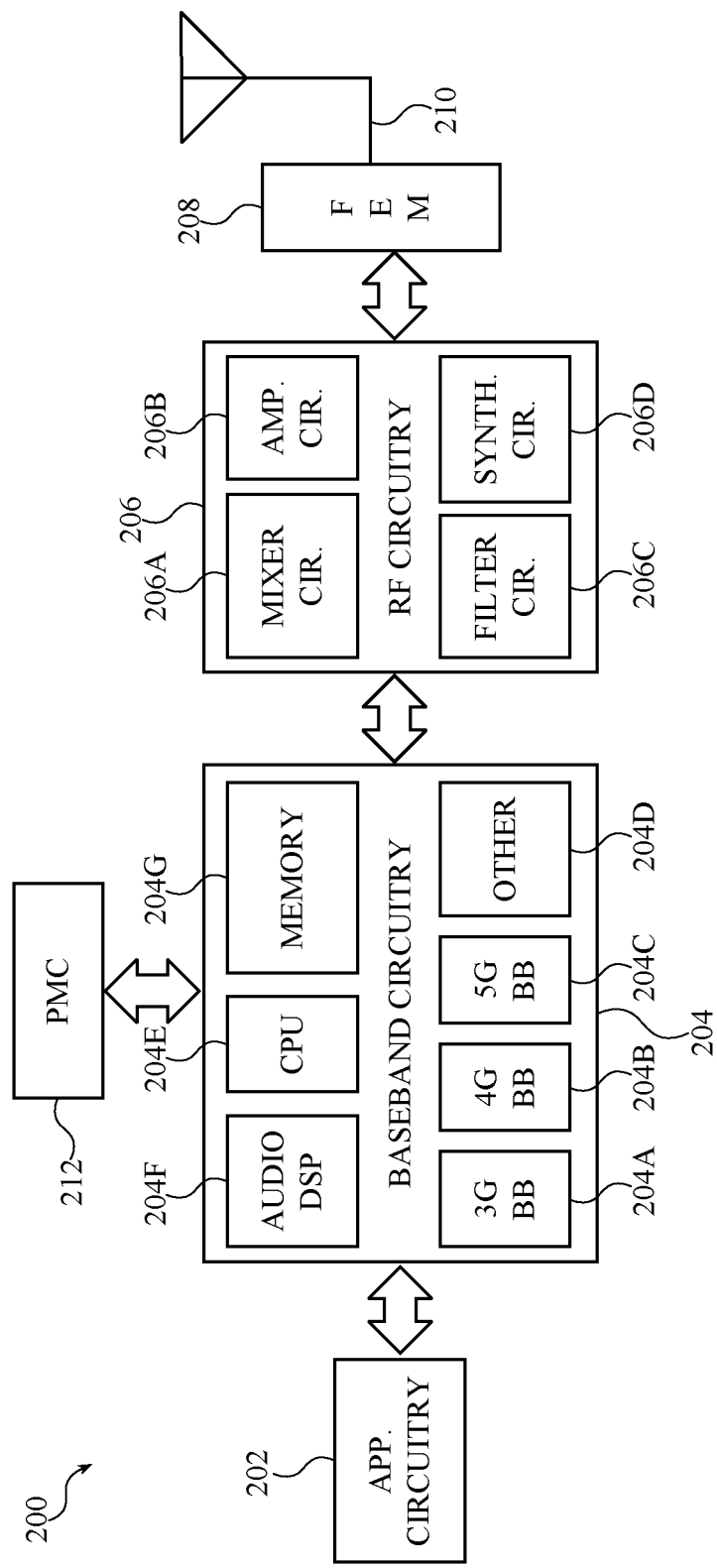
FIG. 2 is a diagram illustrating example components of a device that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some embodiments, the device 200 can include fewer elements (e.g., a RAN node may not utilize application circuitry 202, and instead include a processor/controller to process IP data received from a CN such as 5GC 120 or an Evolved Packet Core (EPC)). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with a NG-RAN, an evolved universal terrestrial radio access network (EUTRAN) or other wireless metropolitan area networks (WMAN), a wireless local area network (WLAN), a wireless personal area network (WPAN), etc. Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc.

to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for superheterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
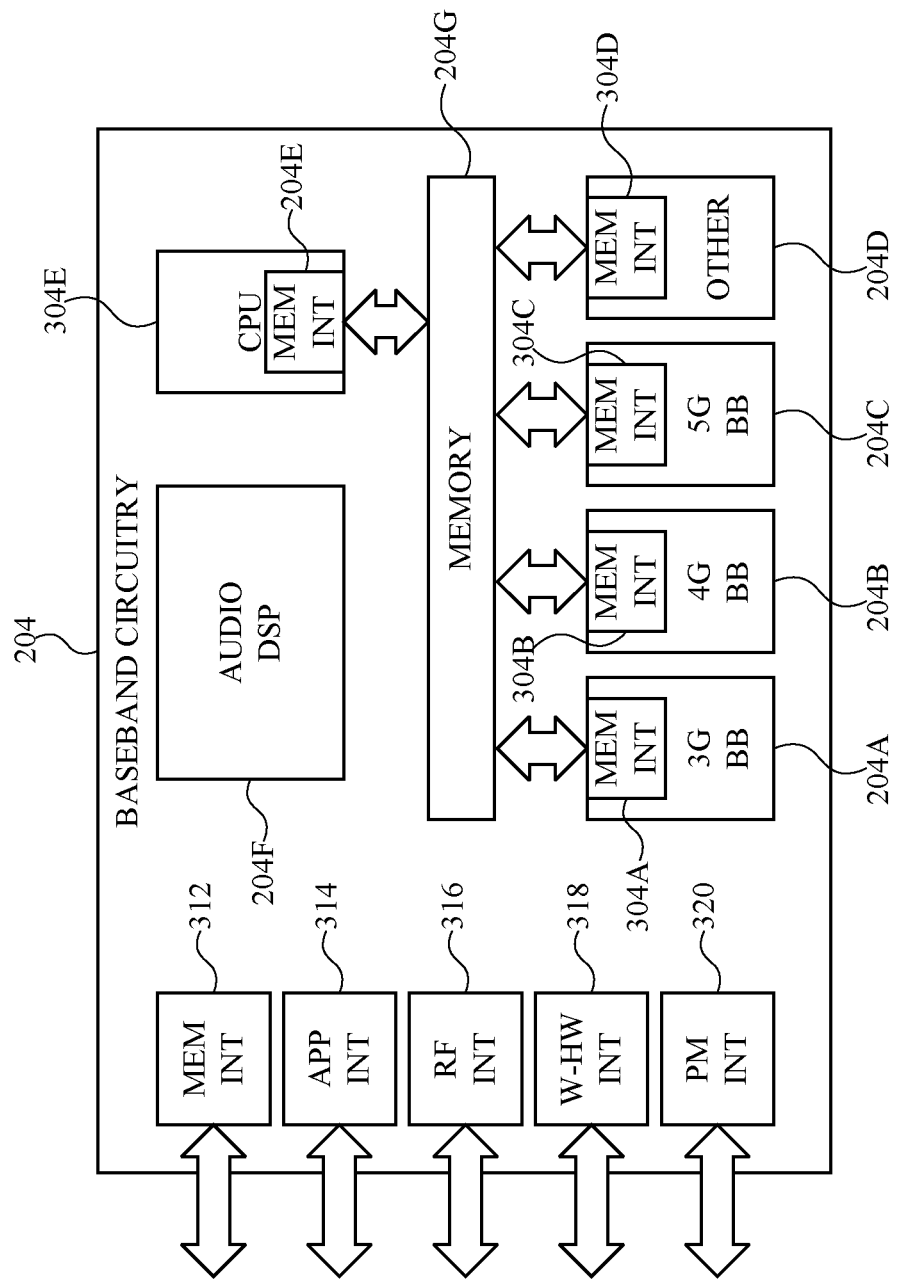
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

As discussed in greater detail herein, various embodiments, which can be employed, for example, at a UE or a Base Station (e.g., a node of a RAN such as a next generation NodeB (gNB), evolved Node B (eNB), etc.) can communicate enhanced feedback (e.g., HARQ (Hybrid Automatic Repeat reQuest), CSI (Channel State Information), etc.) that can facilitate communication of data based on fewer transmissions, according to techniques discussed in greater detail below. In various embodiments, a UE can transmit and a BS can receive feedback (e.g., HARQ, CSI, etc.) associated with a Physical Downlink Shared Channel (PDSCH) transmission that indicates a number of additional coded bits, based on the current transmission parameters, that will allow the UE to decode the PDSCH. In some embodiments, the feedback can indicate one or more redundancy versions (RVs) the BS can transmit to facilitate decoding of the PDSCH by the UE. In the same or other embodiments, enhanced CSI feedback according to techniques discussed herein can be provided, which can facilitate more accurate MCS (Modulation and Coding Scheme) selection.

Figure 4:
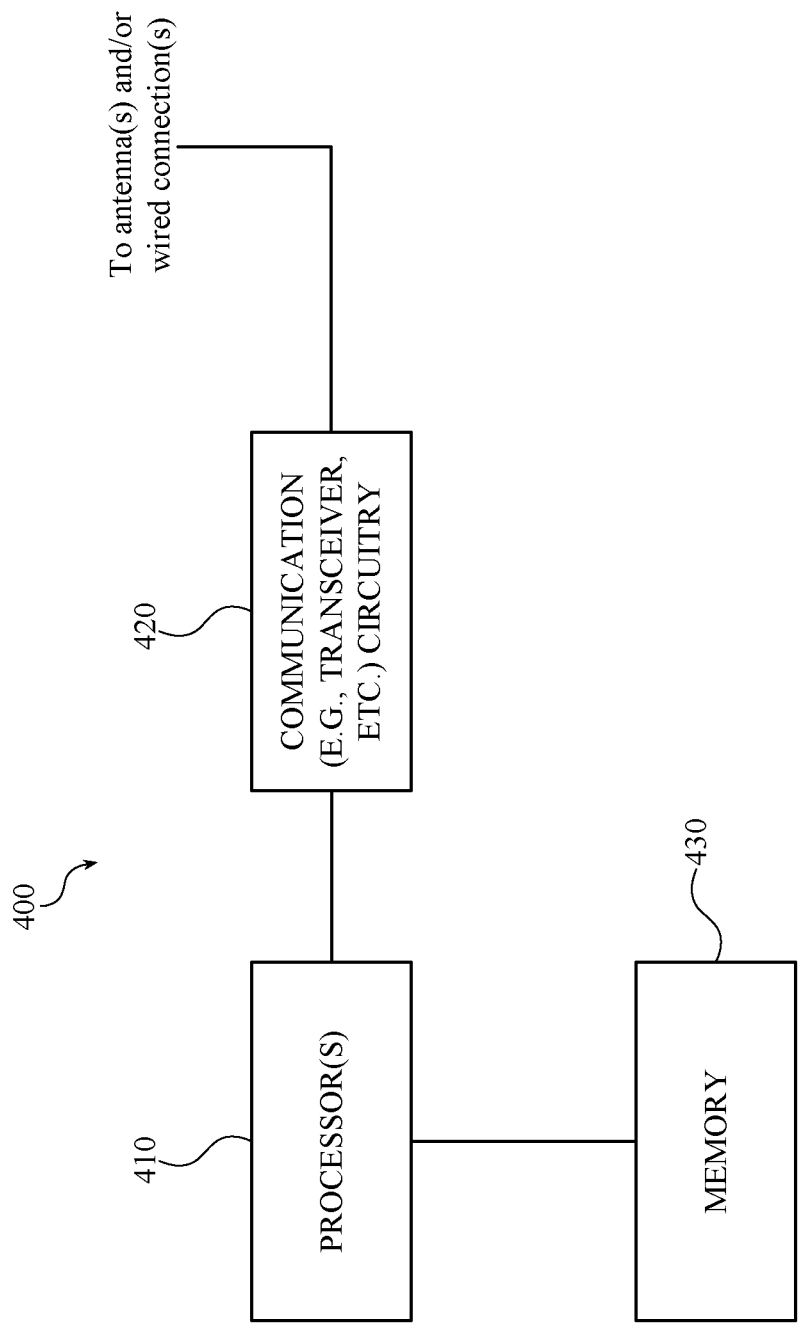
FIG. 4 is a block diagram illustrating a system that facilitates enhanced feedback (e.g., Hybrid Automatic Repeat reQuest (HARQ), Channel State Information (CSI), etc.) to reduce the number of transmissions for complete communication of Physical Downlink Shared Channel (PDSCH), according to various embodiments discussed herein.

Referring to FIG. 4, illustrated is a block diagram of a system 400 employable at a UE (User Equipment), a next generation Node B (gNodeB or gNB) or other BS (base station)/TRP (Transmit/Receive Point), or another component of a 3GPP (Third Generation Partnership Project) network (e.g., a 5GC (Fifth Generation Core Network)) component or function such as a UPF (User Plane Function)) that facilitates enhanced feedback (e.g., HARQ, CSI, etc.) to reduce the number of transmissions for complete communication of PDSCH, according to various embodiments discussed herein. System 400 can include processor(s) 410, communication circuitry 420, and memory 430. Processor(s) 410 (e.g., which can comprise one or more of 202 and/or 204A-204F, etc.) can comprise processing circuitry and associated interface(s) (e.g., a communication interface (e.g., RF circuitry interface 316) for communicating with communication circuitry 420, a memory interface (e.g., memory interface 312) for communicating with memory 430, etc.). Communication circuitry 420 can comprise, for example circuitry for wired and/or wireless connection(s) (e.g., 206 and/or 208), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory 204G, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 410 or transceiver circuitry 420).

Specific types of embodiments of system 400 (e.g., UE embodiments) can be indicated via subscripts (e.g., system $400_{UE}$ comprising processor(s) $410_{UE}$, communication circuitry $420_{UE}$, and memory $430_{UE}$). In some embodiments, such as BS embodiments (e.g., system $400_{gNB}$) and network component (e.g., UPF (User Plane Function), etc.) embodiments (e.g., system $400_{UPF}$) processor(s) $410_{gNB}$ (etc.), communication circuitry (e.g., $420_{gNB}$, etc.), and memory (e.g., $430_{gNB}$, etc.) can be in a single device or can be included in different devices, such as part of a distributed architecture. In embodiments, signaling or messaging between different embodiments of system 400 (e.g., $400_1$ and $400_2$) can be generated by processor(s) $410_1$, transmitted by communication circuitry $420_1$ over a suitable interface or reference point (e.g., a 3GPP air interface, N3, N4, etc.), received by communication circuitry $420_2$, and processed by processor(s) $410_2$. Depending on the type of interface, additional components (e.g., antenna(s), network port(s), etc. associated with system(s) $400_1$ and $400_2$) can be involved in this communication.

In various aspects discussed herein, signals and/or messages can be generated and output for transmission, and/or transmitted messages can be received and processed. Depending on the type of signal or message generated, outputting for transmission (e.g., by processor(s) 410, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping to one or more Resource Elements (REs) (e.g., a scheduled set of resources, a set of time and frequency resources granted for uplink transmission, etc.), wherein each RE can span one subcarrier in a frequency domain and one symbol in a time domain (e.g., wherein the symbol can be according to any of a variety of access schemes, e.g., Orthogonal Frequency Division Multiplexing (OFDM), Single Carrier Frequency Division Multiple Access (SC-FDMA), etc.). Depending on the type of received signal or message, processing (e.g., by processor(s) 410, etc.) can comprise one or more of: identifying physical resources associated with the signal/message, detecting the signal/message, resource element group deinterleaving, demodulation, descrambling, and/or decoding.

In various aspects, one or more of information (e.g., system information, resources associated with signaling, etc.), features, parameters, etc. can be configured to a UE via signaling (e.g., associated with one or more layers, such as L1 signaling or higher layer signaling (e.g., MAC, RRC, etc.)) from a gNB or other access point (e.g., via signaling generated by processor(s) $410_{gNB}$, transmitted by communication circuitry $420_{gNB}$, received by communication circuitry $420_{UE}$, and processed by processor(s) $410_{UE}$.

Depending on the type of information, features, parameters, etc., the type of signaling employed and/or the exact details of the operations performed at the UE and/or gNB in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

At RAN #86 (3GPP (Third Generation Partnership Project) RAN (Radio Access Network) meeting number 86), a new work item, "Enhanced Industrial Internet of Things (IoT) and URLLC support" was approved. There are five objectives for the approved work item.

The first objective is to study, identify and specify if needed, appropriate Physical Layer feedback enhancements for meeting URLLC ("Ultra Reliable and Low Latency Communications") requirements and/or targets covering: (a) UE feedback enhancements for Hybrid Automatic Repeat reQuest ACKnowledgment (HARQ-ACK) [RAN1 (RAN WG1 (Working Group 1))] and (b) CSI (Channel State Information) feedback enhancements to allow for more accurate MCS (Modulation and Coding Scheme) selection [RAN1].

The second objective is to identify potential enhancements to ensure Release 16 feature compatibility with unlicensed band URLLC/IIoT (Industrial IoT) operation in controlled environment [RAN1, RAN2], with detailed objectives to be clarified at RAN#87 based on essential issues to be identified in RAN#87 (if any).

The third objective is intra-UE multiplexing and prioritization of traffic with different priority based on work done in Rel-16 [RAN1], including specifying multiplexing behavior among HARQ-ACK/SR (Scheduling Request)/CSI and PUSCH (Physical Uplink Shared Channel) for traffic with different priorities, including the cases with UCI (Uplink Control Information) on PUCCH (Physical Uplink Control Channel) and UCI on PUSCH.

The fourth objective is enhancements for support of time synchronization, including (a) RAN impacts of SA2 work on uplink time synchronization for TSN (Transmission Sequence Number), if any [RAN2] and (b) Propagation delay compensation enhancements (including mobility issues, if any) [RAN2, RAN1, RAN3, RAN4].

The fifth objective is RAN enhancements based on new QoS (Quality of Service) related parameters if any, e.g. survival time, decided from SA2 [RAN2, RAN3].

Under the first objective, HARQ feedback enhancement and CSI feedback enhancement should be studied.

Various embodiments can provide enhanced HARQ feedback and enhanced CSI feedback that can meet URLLC/IIoT requirements/targets.

During the study item stage of URLLC/IIoT of Rel-16, the processing timeline for URLLC/IIoT was studied by companies and the evaluation has been captured in 3GPP Technical Report (TR) 38.824. To support URLLC/IIoT with a stringent latency requirement/target, in one approach, the network can choose the MCS level conservatively, and ensure there is a high probability that a UE receives a single transmission and decodes the transmitted data packet(s) successfully. With that transmission approach, the number of UEs which can be supported in a network can be rather small, as each of them consumes considerable resource accompanying with the low MCS level assignment, which translates into low system spectral efficiency of the network. Given that spectrum can be rather scarce, serving a small number of UEs while meeting URLLC's latency & reliability requirements may not be an economically viable solution. In another approach, the network may not choose the MCS level too conservatively for the first transmission, for example targeting a block error rate (BER) at $10^{-1}$ (10%) or $10^{-2}$ (1%) instead of $10^{-6}$; then for most cases, with a not small probability $(1-10^{-1})$ or $(1-10^{-2})$, the first transmission of a transport block leads to its successful decoding at a UE; then only for a small fraction of cases ($10^{-1}$ (10%) or $10^{-2}$), will there be HARQ retransmission. For retransmission, the base station can choose a robust transmission to ensure the high reliability (e.g. $10^{-6}$ error rate after retransmission(s)) is achieved. With the second approach, a higher system spectrum efficiency can be achieved than in the case with the first approach.

From the study item phase evaluation, it is also seen that in many cases, the second transmission (or the first retransmission) is the only chance for the network to retransmit the transport block as the latency requirement/target can be quite stringent (e.g., 1 millisecond). From that, how to provide useful feedback information to the network by the UE becomes a critical problem.

There are two issues with the current NR framework for hybrid ARQ (Automatic Repeat reQuest) transmission scheme and CSI feedback framework.

The first issue is that, in the existing hybrid ARQ (HARQ) transmission scheme, the UE feeds back HARQ-ACK with either an ACK or NACK in response to a successful or failed decoding of a transport block; the network retransmits the transport block with an additional PDSCH; and the UE tests whether it can decode the transport block successfully with the newly available soft bits, and generates another HARQ-ACK feedback as a result. The hybrid feedback retransmission scheme can take multiple rounds until the UE finally receives the transport block successfully. For an URLLC application, the network and the UE do not always have the opportunity for multiple rounds of information exchange between them. Accordingly, in various embodiments, techniques discussed herein can be employed to provide enhanced HARQ feedback.

The second issue is that, for existing CSI feedback, from measurement of the desired channel (from CMR (Channel Measurement Resource)) and interference (from ZP IMR (Zero Power Interference Measurement Resource), which is also called CSI-IM in the NR specification) and potentially structured interference from NZP IMR (Non Zero Power Interference Measurement Resource), the UE generates a feedback including all or some of CQI (Channel Quality Indicator), PMI (Precoding Matrix Indicator) and RI (Rank Indicator) for a hypothetical transmission with a targeted block error rate (BER) over a reference resource. However, this CSI feedback is based on a reference resource that does not inherently have anything to do with the ongoing URLLC transmission, and is feedback from which the gNB cannot easily deduce actionable information. Accordingly, various embodiments can employ techniques discussed herein enhanced CSI feedback.

Enhanced HARQ Feedback

Figure 5:
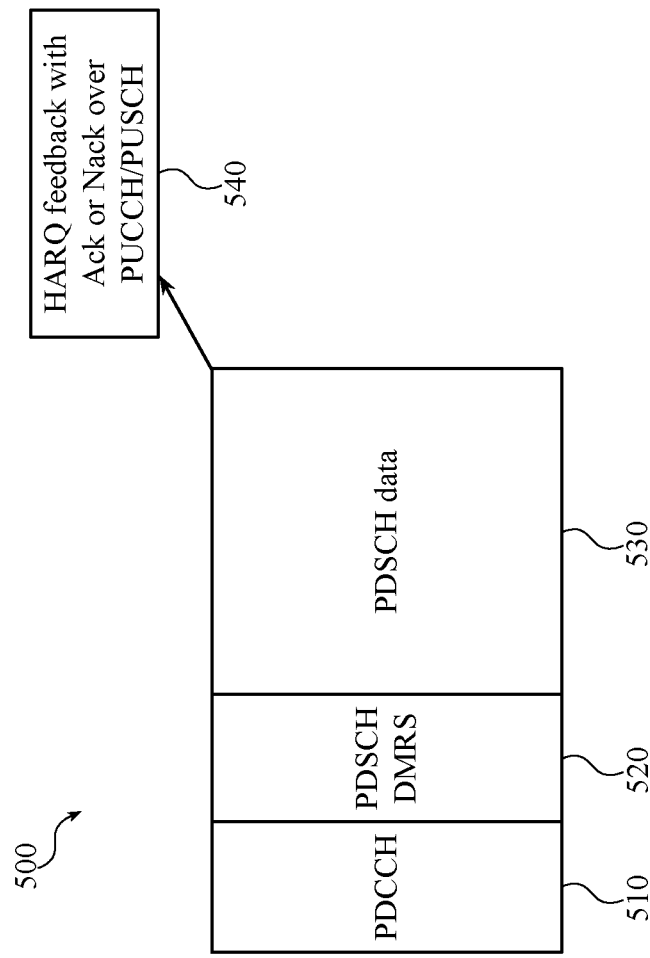
FIG. 5 is a diagram illustrating a first example transmission scenario, involving a single transmission of PDSCH, in connection with various aspects discussed herein.
Figure 6:
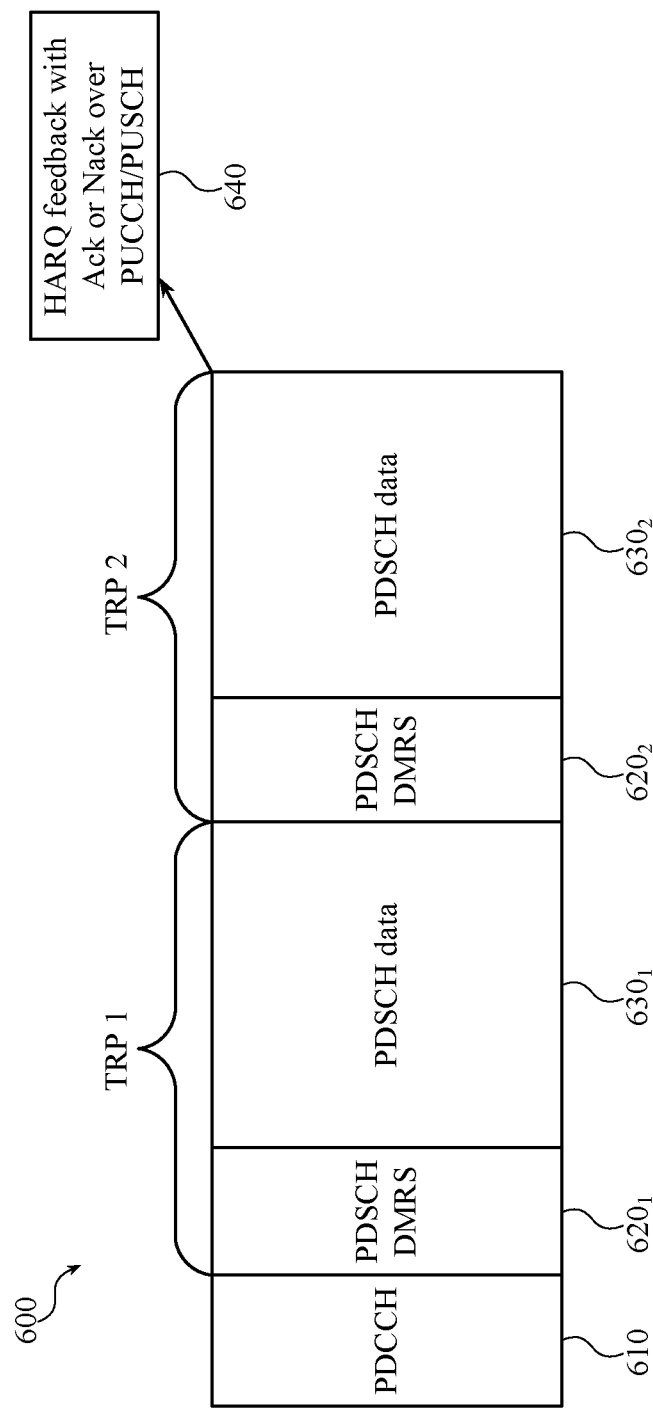
FIG. 6 is a diagram illustrating a second example transmission scenario, involving multiple transmissions of PDSCH from one redundancy version (RV) sequence from multiple Transmit/Receive Points (TRPs), in connection with various aspects discussed herein.
Figure 7:
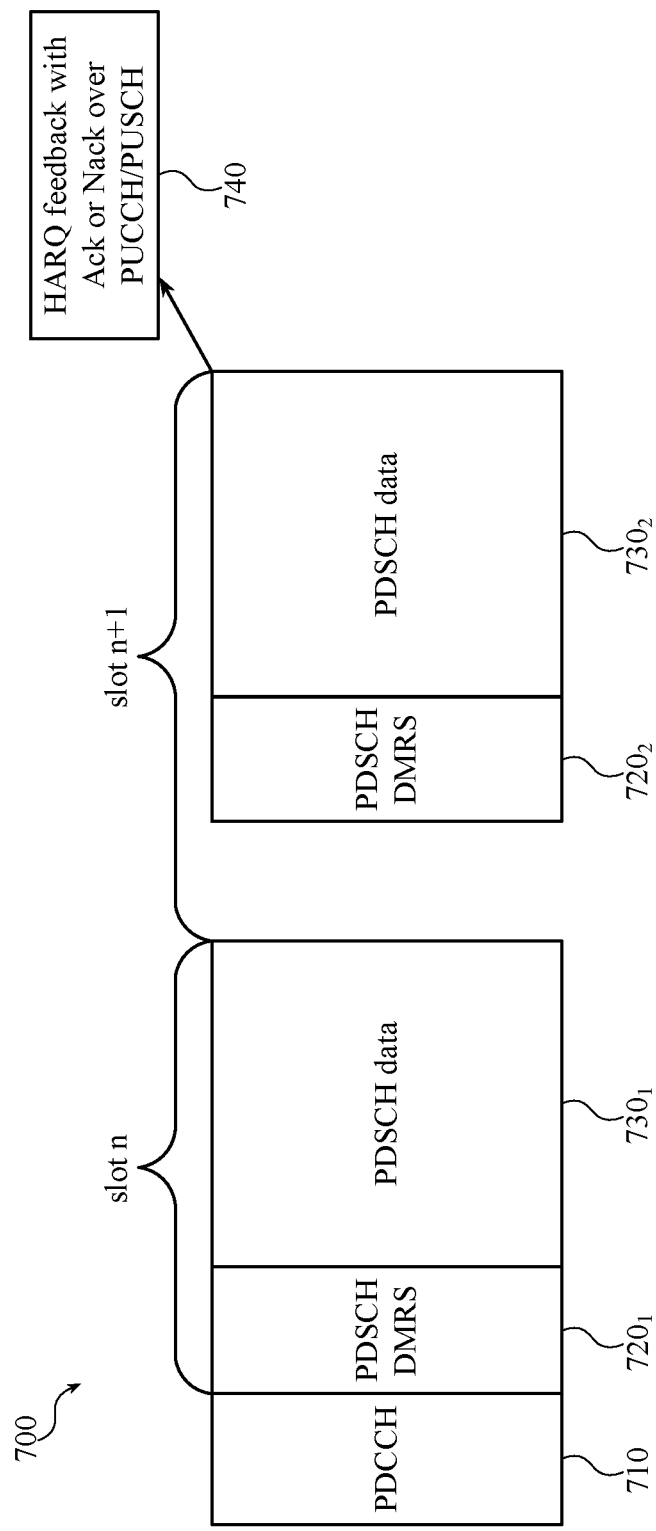
FIG. 7 is a diagram illustrating a third example transmission scenario, involving multiple transmissions of PDSCH from one RV sequence with slot aggregation, in connection with various aspects discussed herein.

FIGS. 5-7 illustrate various existing transmission scenarios and accompanying HARQ feedback in Rel-15 and/or Rel-16. Referring to FIG. 5, illustrated is a first example transmission scenario 500, involving a single transmission of PDSCH 530, in connection with various aspects discussed herein. PDSCH 530 can be scheduled by PDCCH 510 and transmitted with accompanying PDSCH DMRS (Demodulation Reference Signal) 520, in response to which a UE can transmit HARQ feedback 540 (e.g., indicating an ACK or NACK (Negative ACK)) over Physical Uplink Control Channel (PUCCH) or Physical Uplink Shared Channel (PUSCH), as appropriate. Referring to FIG. 6, illustrated is a second example transmission scenario 600, involving multiple transmissions of PDSCH $630_1$ and $630_2$ from one redundancy version (RV) sequence, in connection with various aspects discussed herein. PDSCH $630_1$ and $630_2$ can be scheduled by PDCCH 610 and transmitted with accompanying PDSCH DMRS (Demodulation Reference Signal) $620_1$ and $620_2$ from multiple Transmission/Reception Points (TRPs) (TRP 1 and TRP 2), in response to which a UE can transmit HARQ feedback 640 (e.g., indicating an ACK or NACK) over PUCCH or PUSCH, as appropriate. Referring to FIG. 7, illustrated is a third example transmission scenario 700, involving multiple transmissions of PDSCH $730_1$ and $730_2$ from one RV sequence with slot aggregation, in connection with various aspects discussed herein. PDSCH $730_1$ and $730_2$, e.g. with slot aggregation, can be scheduled by PDCCH 710 and transmitted with accompanying PDSCH DMRS (Demodulation Reference Signal) $720_1$ and $720_2$ in multiple slots (slot n and slot n+1), in response to which a UE can transmit HARQ feedback 740 (e.g., indicating an ACK or NACK) over PUCCH or PUSCH, as appropriate.

Figure 8:
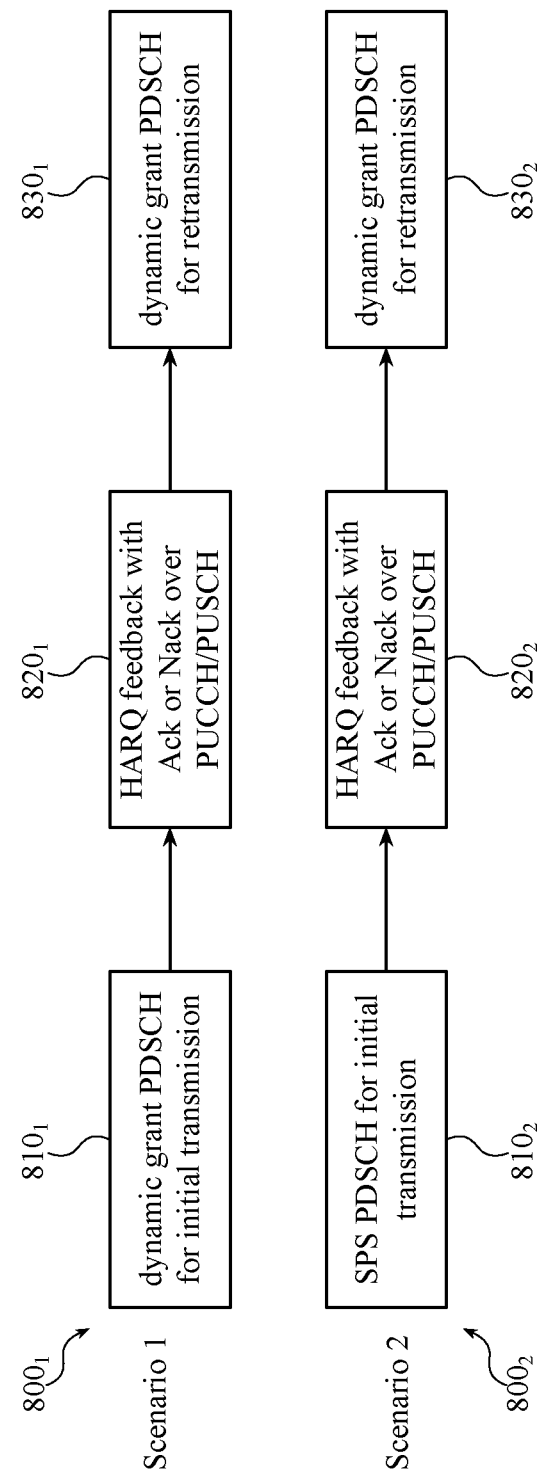
FIG. 8 is a diagram illustrating two different retransmission scenarios based on existing HARQ-ACK feedback, in connection with various aspects discussed herein.

Retransmission in existing transmission scenarios (e.g., 500, 600, or 700) can be in response to HARQ ACK/NACK and can be based at least on a dynamic grant of PDSCH for retransmission. Referring to FIG. 8, illustrated is a diagram showing two different retransmission scenarios $800_1$ and $800_2$ based on existing HARQ-ACK feedback, in connection with various aspects discussed herein. In a first scenario $800_1$, a dynamic grant schedules the PDSCH for the initial transmission $810_1$, which can be, for example, according to any of transmission scenarios 500, 600, or 700. Based on the initial transmission $810_1$, the UE can transmit HARQ feedback indicating an ACK/NACK $820_1$, in response to which the BS (e.g., gNB, etc.) can schedule retransmission of the PDSCH based on a dynamic grant at $830_1$. The second scenario $800_2$ is similar to the first scenario $800_1$, but the initial transmission $810_2$ can be based on Semi-Persistent Scheduling (SPS).

In an existing hybrid ARQ scheme, as the latency requirement/target may be more relaxed than for URLLC, e.g., for eMBB (enhanced Mobile BroadBand), the network and the UE can afford to use parsimony of feedback information (HARQ feedback consisting of a single feedback bit) for each round of feedback, and potentially conducted over many rounds to explore and finally find the number of retransmissions for successful decoding.

In URLLC, in many cases, due to stringent latency requirement/targets, the 2nd transmission is the only opportunity for the gNB to provide more coded bits to the UE, so they can be combined with previously received coded bits (LLRs) for successful decoding. As such, if a UE does not decode PDSCH successfully for the first transmission or for a retransmission when the latency bound is in danger of being exceeded, the more relevant information for the UE to provide is not merely the fact the UE fails to decode the transport block, but rather how much more redundancy from the gNB can allow the UE to decode the transport block in the next attempt. Accordingly, in various embodiments (e.g., for URLLC, etc.), a first set of techniques can be employed wherein the UE can provide, as feedback (e.g., HARQ, etc.) associated with a PDSCH transport block (TB), an indication of how much redundancy can allow the UE to decode the transport block.

In various aspects, information relevant to the number of additional coded bits to allow the UE to decode the PDSCH with the current transmission parameters is referred to herein as "redundancy gap." Additionally, in some aspects (e.g., in connection with CSI-related embodiments), a "redundancy gap" also can be defined with respect to the regular CSI measurement resources, as explained in greater detail below.

The quality of soft bits (e.g., based on LLRs, etc.) at a UE can be affected by a number of factors, including: (1) the RV(s) of previous transmission(s); (2) missed Physical Downlink Control Channel (PDCCH) reception; (3) interference from other cells; or (4) aged CSI (which can lead to suboptimal MCS selection).

Assuming the same MCS level and/or precoding by the gNB is used as a reference for future transmissions desired at the UE, in various embodiments, the redundancy gap can be quantified as how many repetitions (e.g., potentially with different RVs) will allow the UE to successfully decode the encoded transport block.

Although some specific examples and embodiments discuss URLLC, the techniques discussed herein can be employed in connection with a variety of communications, including but not limited to URLLC. Various embodiments can employ one or more of several techniques discussed herein for UE feedback prior to retransmission.

In various embodiments according to the first set of techniques, in response to receiving PDSCH, a UE (e.g., employing system $400_{UE}$, etc.) can generate feedback quantifying the redundancy gap as described herein. Based at least on the DMRS for the current PDSCH reception and/or the PDSCH LLRs and/or PDSCH SINRs, the UE can determine the redundancy gap (e.g., based on the quality of reception of the RV(s) already transmitted), and can quantify the redundancy gap to successful decoding as described herein. In various embodiments, the UE can indicate (e.g., via HARQ) a starting RV, the length of the RV sequence, and the UE can one of assume a configured RV sequence or indicate a preferred RV sequence (e.g., [0 3 0 3] (repeating) vs [0 2 3 1] (repeating), etc.).

In a first set of embodiments, with a given RV (e.g., "0"), the UE can recommend how many repetitions can allow successful decoding (e.g. 1, 2, 3, 4, etc.). For example, with 2 repetitions, then it can be recommended that the BS (e.g., gNB, etc.) retransmits the PDSCH with 2 transmissions with the given RV (e.g., "0"). In some such embodiments, the UE can denote the recommended RV sequence as [0] for one repetition, [0,0] for 2 repetitions, [0,0,0] for 3 repetitions, etc. The recommended HARQ RV can be for a reference transmission.

In the first set of embodiments, the reference transmission can be (1) the current transmission of PDSCH (if PDSCH slot aggregation or mTRP (multiple-Transmit-Receive Point) Scheme 3 or Scheme 4 is used, then one option is to use only one PDSCH (counted, e.g., from either TRP1 or TRP 2; from Slot n or Slot n+1) as a reference transmission, or another option is to use all PDSCHs from PDSCH slot aggregation or mTRP Scheme 3 mTRP Scheme 4); or (2) the first transmission of a transport block; or (3) PRBs (Physical Resource Blocks) in the full BWP (BandWidth Part) over a number of OFDM (Orthogonal Frequency Division Multiplexing) symbols, which can be configured/indicated to the UE or determined from table lookup from current transmission's PRB allocation and time domain allocation.

In a second set of embodiments, the UE can suggest a RV sequence to the BS (e.g., gNB), for example, [3], [0 3], [0 3 0 3], [0 3 3], etc. To reduce hypotheses for the UE to test and also to reduce signaling overhead, the allowed RVs can be limited to a subset of {0, 1, 2, 3}, for example, {0,3}.

Figure 9:
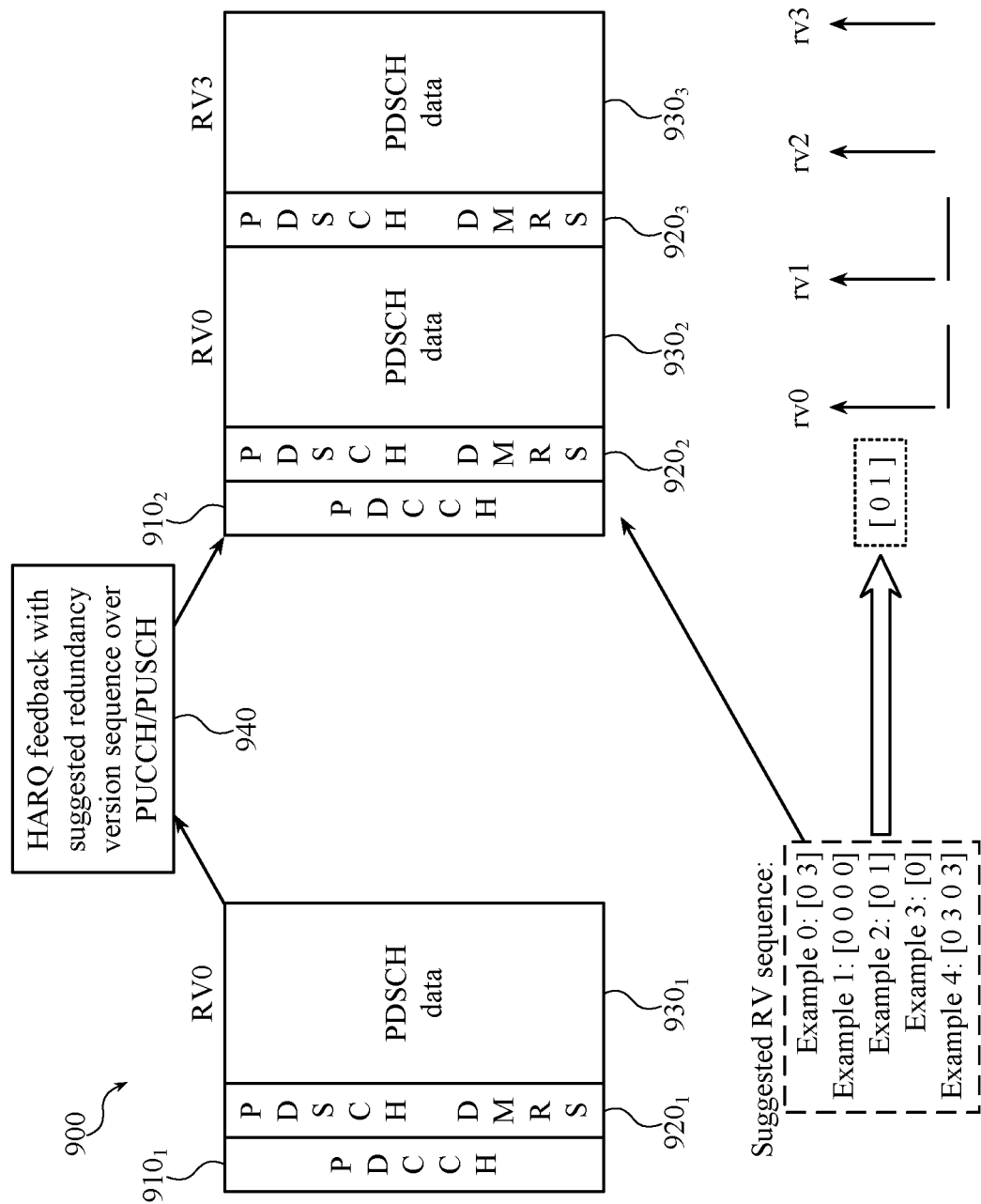
FIG. 9 is a diagram illustrating a first example retransmission scenario, involving a single initial transmission of PDSCH and HARQ feedback indicating a suggested RV sequence, according to various embodiments discussed herein.

Referring to FIG. 9, illustrated is a first example retransmission scenario 900, involving a single initial transmission of PDSCH $930_1$ and HARQ feedback 940 indicating a suggested RV sequence, according to various embodiments discussed herein. Initial PDSCH $930_1$ (RV0 in example scenario 900) can be scheduled by PDCCH $910_1$ and transmitted with accompanying PDSCH DMRS (Demodulation Reference Signal) $920_1$, in response to which a UE can transmit HARQ feedback 940 indicating a suggested RV sequence according to techniques described herein over PUCCH or PUSCH, as appropriate. In example scenario 900, the suggested RV sequence can comprise RV0 and RV3, which can be indicated via any of the techniques discussed herein (e.g., as a RV sequence [0 3], as a starting RV [0] and length 2 based on a configured or indicated (e.g., via HARQ feedback 940) RV sequence (e.g., [0 3 0 3], etc.)). In response to HARQ feedback 940, the BS (e.g., gNB, etc.) can schedule, via PDCCH $910_2$, a PDSCH retransmission comprising RVs (e.g., PDSCH $930_2$ of RV0 and PDSCH $930_3$ of RV3) that can be selected based at least on HARQ feedback 940, and can transmit PDSCH $930_2$ and $930_3$ along with accompanying PDSCH DMRS $920_2$ and $920_3$.

In embodiments of the first set or the second set (e.g., as in FIG. 9), the UE can indicate (for the redundancy gap, e.g., in HARQ) the specific sequence of RVs to be transmitted by the BS (e.g., gNB, etc.) by explicitly indicating each RV of the requested sequence, such as in the following examples shown in FIG. 9: (0) the UE can indicate RV sequence [0 3], in response to which the BS can transmit RV 0 and RV 3 (as illustrated at $930_2$ and $930_3$); (1) the UE can indicate RV sequence [0 0 0 0], in response to which the BS can transmit RV 0 four times; (2) the UE can indicates RV sequence [0 1], in response to which the BS can transmit RV 0 and RV 1 (as illustrated in the bottom right of FIG. 9); (3) the UE can indicate RV sequence [0], in response to which the BS can transmit RV 0; or (4) the UE can indicate RV sequence [0 3 0 3], in response to which the BS can transmit RV 0, RV 3, RV 0, and RV 3. Other example scenarios are also possible.

In a third set of embodiments, a basic RV sequence can be agreed between the BS (e.g., gNB) and UE beforehand (e.g., configured to the UE, etc.), wherein the RV sequence recommended by the UE is read out over the basic RV sequence based on an indicated length and optionally an indicated starting position. Wrap-around can be used if the last element of the basic RV sequence is reached before the indicated length is met. For example, assuming the basic RV sequence is [0 2 3 1], the UE can recommend a starting position at "3" with length 3 (e.g., 3 RVs), which is equivalent to explicitly indicating [3 1 0] to the BS (e.g., gNB) (as in the second set of embodiments). In various embodiments, any of a variety of basic RV sequences can be employed (e.g., [0 2 3 1], [0 3 0 3], etc.).

To establish the basic RV sequence between the BS (e.g., gNB) and UE, in some embodiments, it can be predefined (e.g., in the 3GPP specification, e.g. [0 2 3 1], etc.), while in other embodiments, the basic RV sequence can be signaled by the BS (e.g., gNB) to the UE through RRC (Radio Resource Control) signaling as a single basic RV sequence or a basic RV sequence selected from multiple basic RV sequences. In scenarios wherein multiple basic RV sequences are signaled to the UE through RRC signaling, then a MAC CE from the gNB can be used to inform the UE which of them is selected. When there is a basic RV sequence established, the UE can indicate the RV sequence length, and optionally the starting version of the RV sequence without specifying the RV sequence. Assuming a basic RV sequence of [0 2 3 1] (repeating with wrap-around if necessary), the following are examples of RV sequences that can be indicate via signaling, according to the third set of embodiments: (a) [0 2], by indicating starting version "0" and length 2; (b) [0 2 3 1], by indicating starting version "0" and length 4; (c) [2 3 1], by indicating starting version "2" and length 3; and (d) [3], by indicating starting version "3" and length 1.

Providing the UE the capability to indicate the starting RV can provide advantages, as made clear in the following example scenarios. In a first example scenario, the first transmission is with RV "0", the UE receives the PDSCH with benign channel/interference condition, and the UE assesses that just a little bit more redundancy information from the gNB would allow it to decode the transport block successfully, so that in this case the UE can indicate "1" for retransmission (e.g. for lowering the code rate). In a second example scenario, the first transmission is with RV "0", the UE receives the PDSCH with severe interference and/or channel fading, such that the soft bits for systematic bits of codeblock(s) are unreliable, then the UE can ask for retransmission to start with RV "0" to ensure systematic bits are retransmitted. As the first and second example scenarios show, depending on the scenario, a different starting version for the recommended RV sequence can be more advantageous to the UE, depending on the current status of its soft bits.

In a fourth set of embodiments, the UE can recommend a starting position in retransmission through a HARQ RV, and a recommended number of coded bits. The coded bits can be measured with respect to the number of coded bits in a reference transmission.

The reference transmission can be (1) the current transmission of PDSCH (if PDSCH slot aggregation or mTRP (multiple-Transmit-Receive Point) Scheme 3 or Scheme 4 is used, then one option is to use only one PDSCH (counted, e.g., from either TRP1 or TRP 2; from Slot n or Slot n+1) as a reference transmission, or another option is to use all PDSCHs from PDSCH slot aggregation or mTRP Scheme 3 mTRP Scheme 4); or (2) the first transmission of a transport block; or (3) PRBs (Physical Resource Blocks) in the full BWP (BandWidth Part) over a number of OFDM (Orthogonal Frequency Division Multiplexing) symbols, which can be configured/indicated to the UE or determined from table lookup from current transmission's PRB allocation and time domain allocation.

The recommended number of coded bits can be either an integer multiple or a quantized multiple (e.g. 2.5, 3, 3.5 or 2.75, 3, 3.25) of the number of coded bits in the reference transmission.

Figure 10:
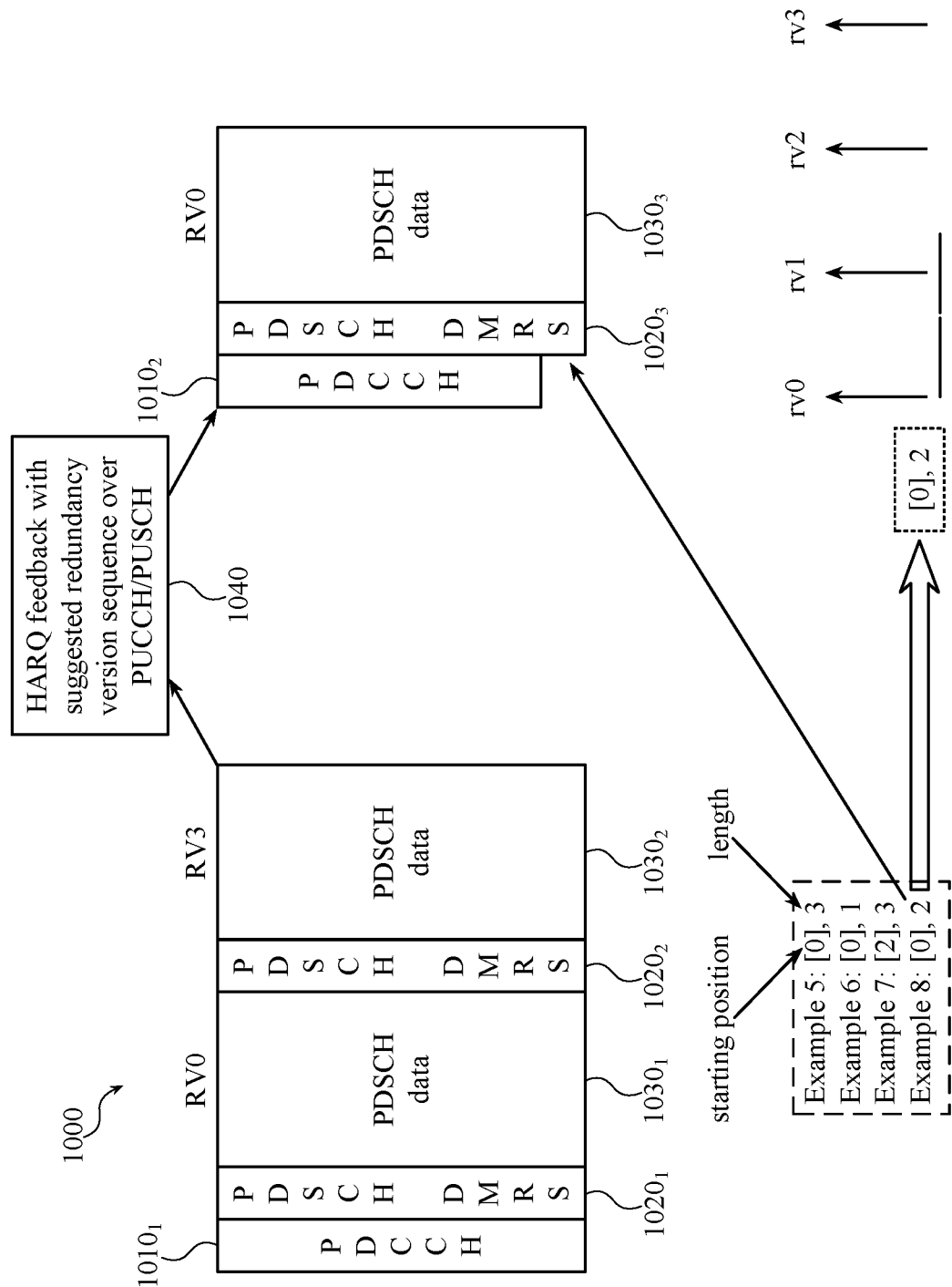
FIG. 10 is a diagram illustrating a second example retransmission scenario, involving initial transmission of multiple PDSCH (e.g., two RV of a RV sequence) and HARQ feedback indicating a suggested RV sequence, according to various embodiments discussed herein.

Referring to FIG. 10, illustrated is a second example retransmission scenario 1000, involving initial transmission of multiple PDSCH 1030$_1$ and 1030$_2$ (e.g., two RV of a RV sequence) and HARQ feedback 1040 indicating a suggested RV sequence, according to various embodiments discussed herein. Initial PDSCH 1030$_1$ (RV0 in example scenario 1000) and 1030$_2$ (RV3 in example scenario 1000) can be scheduled by PDCCH 1010$_1$ and transmitted with accompanying PDSCH DMRS 1020$_1$ and 1020$_2$, respectively, in response to which a UE can transmit HARQ feedback 1040 indicating a suggested RV sequence according to techniques described herein over PUCCH or PUSCH, as appropriate. In example scenario 1000, the suggested RV sequence can comprise RV0 and RV3, which can be indicated via any of the techniques discussed herein (e.g., as a RV sequence [0 3], as a starting RV [0] and length 2 based on a configured or indicated (e.g., via HARQ feedback 940) RV sequence (e.g., [0 3 0 3], etc.)). In response to HARQ feedback 1040, the BS (e.g., gNB, etc.) can schedule, via PDCCH 1010$_2$, a PDSCH retransmission comprising RVs (e.g., PDSCH 1030$_3$ of RV0) that can be selected based at least on HARQ feedback 1040, and can transmit PDSCH 1030$_3$ along with accompanying PDSCH DMRS 1020$_3$.

In embodiments of the third or fourth set (e.g., as in FIG. 10), the UE can indicate (for the redundancy gap, e.g., in HARQ) a length (e.g., as a number of RVs or a number of coded bits as a multiple of a reference transmission) and a starting RV for a RV sequence, wherein the RV sequence can be one of a predefined RV sequence, a configured RV sequence (e.g., the BS (e.g., gNB, etc.) can configure [0303] or [0231] to the UE) or an indicated RV sequence (e.g., the UE can indicate [0303] or [0231] (or some other sequence) via one or more bits as a selected RV sequence to the BS (e.g., gNB).

In FIG. 10, examples 5-8 are shown for the fourth set of embodiments. For example 8, shown at the bottom right of FIG. 10, the UE can recommend a starting position from RV "0" and can request 2 times the coded bits as in the reference transmission. In response to the UE's request, if the reference transmission comprises X PRBs over Y symbols, the BS (e.g., gNB) can give the UE a retransmission with 2·X PRBs over Y symbols with RV "0". Note that, depending the number of coded bits in the current PDSCH transmission, there can be either a gap or overlap between the coded bits for RV "0" and "1" as shown for Example 2 in FIG. 9 (shown as two bars with space between them); in contrast, with the fourth set of embodiments, as a single RV as starting position (shown as two bars side-by-side), the gap or overlap between coded bits for different RVs can be avoided. FIG. 10 also shows the following additional examples (assuming a reference transmission of X PRBs over Y symbols): (5) the UE can indicate a RV sequence starting at RV [0] and a length of 3 (e.g., 3 times the number of coded bits of the reference transmission), in response to which the BS (e.g., gNB) can give the UE a retransmission with 3.X PRBs over Y symbols with RV "0"; (6) the UE can indicate a RV sequence starting at RV [0] and a length of 1, in response to which the BS (e.g., gNB) can give the UE a retransmission with X PRBs over Y symbols with RV "0"; and (7) the UE can indicate a RV sequence starting at RV [2] and a length of 3, in response to which the BS (e.g., gNB) can give the UE a retransmission with 2.X PRBs over Y symbols with RV "2". Other example scenarios are also possible.

In various embodiments according to the first set of techniques (e.g., related to HARQ feedback), the UE can suggest a HARQ redundancy version (RV) sequence to the BS (e.g., gNB) in response to an initial transmission if the UE did not successfully receive the transport block (TB) correctly in the original transmission. In connection with the first set of techniques, if the UE receives a given TB correctly in an initial PDSCH transmission, the UE can feed back "ACK" as HARQ feedback in response to the initial PDSCH transmission. If the UE does not receive the TB correctly, the UE can feed back a HARQ RV sequence, which can comprise (1) a sequence with RVs from {0, 1, 2, 3} or a subset thereof (e.g., {0, 3}, etc.) (as in the first or second set of embodiments), or (2) a RV sequence that can be indicated as a length (and optionally a starting RV) that can be read out over a basic redundancy version sequence (e.g., [0 2 3 1], [0 3 0 3], etc.) that can be predefined in the specification or configured RRC signaling/MAC CE (as in the third set of embodiments); or (3) a RV sequence comprising a starting position and an integer or quantized multiple of coded bits in a reference transmission (as in the fourth set of embodiments).

Figure 11:
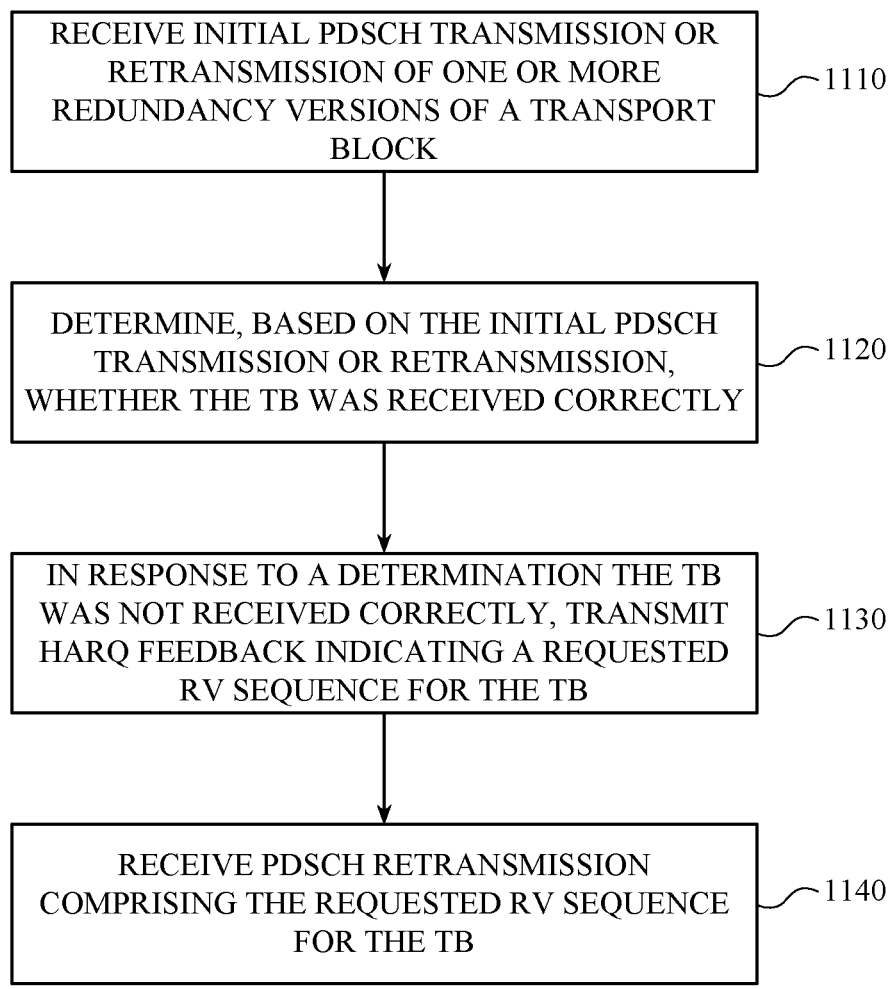
FIG. 11 is a flow diagram illustrating an example method employable at a User Equipment (UE) that facilitates generation of HARQ feedback to PDSCH that indicates a redundancy gap associated with the PDSCH, according to various embodiments discussed herein.

Referring to FIG. 11, illustrated is a flow diagram of an example method 1100 employable at a UE that facilitates generation of HARQ feedback to PDSCH that indicates a redundancy gap associated with the PDSCH, according to various embodiments discussed herein. In other aspects, a machine readable medium can store instructions associated with method 1100 that, when executed, can cause a UE (e.g., employing system $400_{UE}$) to perform the acts of method 1100.

At 1110, an initial PDSCH transmission or a retransmission of one or more RVs of a TB can be received.

At 1120, a determination can be made, based on the initial PDSCH transmission or retransmission, as to whether the TB was received correctly or whether additional coded bits are needed to correctly receive the TB.

At 1130, in response to a determination that the TB was not correctly received, HARQ feedback can be transmitted that indicates a requested RV sequence for the TB (e.g., according to any of the techniques or embodiments discussed herein), which can be based on a UE calculation of additional coded bits that can facilitate correct reception of the TB. Alternatively, in response to a determination that the TB was correctly received, HARQ feedback can be transmitted that indicates an ACK, and method 1100 can end.

At 1140, a PDSCH retransmission comprising the requested RV sequence for the TB can be received.

Additionally or alternatively, method 1100 can include one or more other acts described herein in connection with various embodiments of a UE and/or system $400_{UE}$ and the first set of techniques.

The enhanced HARQ feedback schemes as disclosed here can be applied to failed initial transmission by the UE through network configuration. Another possibility that can be also considered is that the gNB can send an indication to require the enhanced feedback explicitly. In one example, a trigger field for enhanced HARQ feedback is included in the downlink DCI scheduling an initial transmission or a retransmission, and the trigger field can indicate either "0" or "1", with "0" the conventional HARQ feedback is requested by the gNB, where a single bit feedback for a transport block is generated; with "1" the enhanced HARQ feedback is requested by the gNB. There can be different PUCCH resources/PUCCH resource sets associated with those two situations as indicated by the trigger field, so multiple bit feedback with the enhanced HARQ feedback scheme can be transmitted with a PUCCH resource with suitable protection rather than being squeezed into a PUCCH resource for a smaller payload, e.g. for a single bit feedback.

Figure 12:
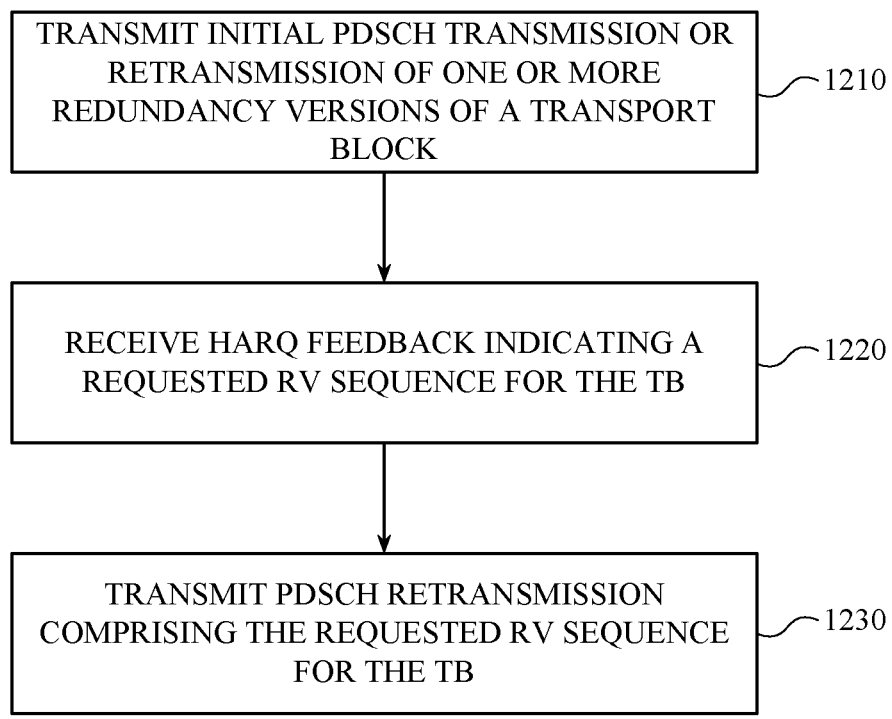
FIG. 12 is a flow diagram illustrating an example method employable at a Base Station (BS) that facilitates retransmission of PDSCH based on HARQ feedback that indicates a redundancy gap associated with the PDSCH, according to various embodiments discussed herein.

Referring to FIG. 12, illustrated is a flow diagram of an example method 1200 employable at a BS (e.g., gNB) that facilitates retransmission of PDSCH based on HARQ feedback that indicates a redundancy gap associated with the PDSCH, according to various embodiments discussed herein. In other aspects, a machine readable medium can store instructions associated with method 1200 that, when executed, can cause a BS (e.g., employing system $400_{gNB}$, system $400_{eNB}$, etc.) to perform the acts of method 1200.

At 1210, an initial PDSCH transmission or retransmission of one or more RVs of a TB can be transmitted to a UE.

At 1220, HARQ feedback can be received that indicates a requested RV sequence for the TB (e.g., according to any of the techniques or embodiments discussed herein). Alternatively, HARQ feedback can be received that indicates an ACK, and method 1200 can end.

At 1230, a PDSCH retransmission comprising the requested RV sequence for the TB can be transmitted.

Additionally or alternatively, method 1200 can include one or more other acts described herein in connection with various embodiments of a BS and/or system $400_{gNB}$, system $400_{eNB}$, etc. and the first set of techniques.

Enhanced CSI Feedback

A second set of techniques facilitate enhanced CSI feedback, which can provide information regarding a redundancy gap associated with a PDSCH transmission.

In various embodiments employing the second set of techniques, a UE can generate CSI feedback that indicates an additional number of coded bits that can allow the UE to correctly receive a transmission.

In some such embodiments, from the CSI measurement resource(s) which can include NZP CSI-RS resource(s) for channel measurement, NZP CSI-RS resource(s) for interference measurement, ZP IMR (zero power CSI resource(s) for interference measurement)), the UE can feed back RI (rank indication), PMI(s) (Precoding matrix Indicators), and information related to redundancy gap instead of feeding back CQI, wherein the UE can quantify the redundancy gap to successful decoding by indicating a requested RV sequence, which can be indicated similarly to any of the techniques discussed in connection with embodiments employing the first set of techniques (e.g., for HARQ feedback) or as discussed elsewhere herein.

For example, in some embodiments employing the second set of techniques, the UE can indicate, in CSI feedback, the starting RV, and the length of the requested RV sequence, wherein the UE can assume a configured RV sequence (e.g., a basic RV sequence, etc.), or can indicate a preferred RV sequence (e.g. [0 3 0 3] vs [0 2 3 1], etc.), as in the following examples: (1) the UE indicates RV sequence [0]; (2) the UE indicates RV sequence [3]; (3) the UE indicates RV sequence [0 3 0]; (4) the UE indicates RV sequence [0 3 0 3 0]; or (5) the UE indicates RV sequence [3 1 0 2 3].

As another example, in other embodiments employing the second set of techniques, the UE can indicate a desired repetition number (K), and a starting RV for a predefined RV sequence, a configured RV sequence (e.g., the gNB configures [0303] or [0231] to the UE), or a UE-indicated RV sequence (e.g., the UE indicates [0303] or [0231] is preferred to the gNB).

In various embodiments employing the second set of techniques, the UE can feedback the requested RV sequence to the BS (e.g., gNB) as part of a CSI report. For example, the UE can indicate a RV sequence that comprises X RV at "0", wherein X is fed back by the UE via CSI. As another example, the UE can indicate a RV sequence by indicating a starting RV and a length (e.g., of a basic RV sequence) via CSI, for example, starting with "2" and the sequence is given by [2 3]. The basic RV sequence can be predefined, configured, selected and indicated by the UE (e.g., from among predefined RV sequences and/or preconfigured potential RV sequences), etc. In embodiments wherein there is more than one potential basic RV sequence, the basic RV sequence is configured to the UE or selected by the UE, and the potential basic RV sequences can comprises predefined and/or previously configured RV sequences such as [0 2 3 1], [0 3 0 3], [0 0 0 0], etc.

In some embodiments of the second set of techniques, as discussed above, the UE can feed back RI, PMI(s), and redundancy gap, which are of immediate value to the ongoing transmission. Optionally, in various embodiments, the UE can also feedback CQI (e.g., wideband and/or subband), which can provide feedback that, while not of value in the retransmission of the TB(s) for which the redundancy gap is indication, is of value to other transmissions. Thus, in various such embodiments, the UE can generate CSI that indicates {RI, PMI(s), CQI(s), redundancy gap}.

In various embodiments employing the second set of techniques, CSI feedback can be triggered by a downlink DCI (Downlink Control Information) or by an uplink DCI.

If the feedback is triggered by a downlink DCI, a CSI trigger state field can be added to the downlink DCI, so the downlink DCI can indicate both the PDSCH and CSI measurement resources, and rate matching around the indicated CSI measurement resources can be conducted.

If the feedback is triggered by an uplink DCI, to create the linkage between the uplink DCI and a previous (e.g., reference) PDSCH transmission, various embodiments can employ one of the following options. In a first option, the reference PDSCH transmission can be the most recent PDSCH transmission prior to the triggered transmission of uplink CSI feedback (over PUSCH or PUCCH). In a second option, the reference PDSCH transmission can be the most recent PDSCH that meets certain timing requirements, for example, at least the most recent PDSCH transmission prior to the uplink DCI. In a third option, for URLLC, there can be PDSCHs for different traffic types, and priority indication and/or traffic type indication can be used to match the triggered feedback and the reference PDSCH transmission unambiguously. In one example of the third option, in slot n, PDSCH-1 is for eMBB, PDSCH-2 is for URLLC (e.g., wherein the traffic type/priority is indicated implicitly or explicitly), and if an uplink DCI triggers a feedback according to the second set of techniques, then traffic type indication/priority indication can be attached to the uplink DCI itself or its indicated transmission (e.g., if URLLC is indicated, then PDSCH-2 is the reference PDSCH instead of PDSCH-1).

In various embodiments employing the second set of techniques, the BS (e.g., gNB) can indicate the repetition number, the starting RV to the UE for PDSCH reception.

Figure 13:
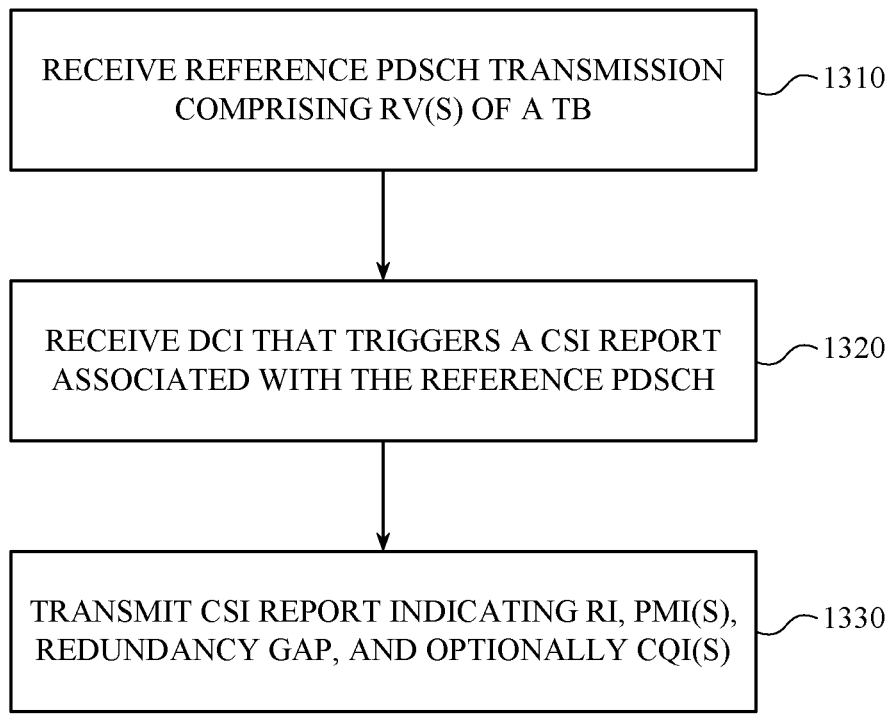
FIG. 13 is a flow diagram illustrating an example method employable at a UE that facilitates generation of CSI feedback based on reference PDSCH that indicates a redundancy gap associated with the PDSCH, according to various embodiments discussed herein.

Referring to FIG. 13, illustrated is a flow diagram of an example method 1300 employable at a UE that facilitates generation of CSI feedback based on reference PDSCH that indicates a redundancy gap associated with the PDSCH, according to various embodiments discussed herein. In other aspects, a machine readable medium can store instructions associated with method 1300 that, when executed, can cause a UE (e.g., employing system $400_{UE}$) to perform the acts of method 1300.

At 1310, a reference PDSCH transmission of one or more RVs of a TB is assumed from a BS.

At 1320, a DCI (e.g., uplink or downlink, as discussed herein) can be received that triggers a CSI report associated with the reference PDSCH (e.g., via explicit indication or implicit association).

At 1330, a CSI report can be transmitted to the BS that indicates a RI, one or more PMIs, a redundancy gap associated with the reference PDSCH (e.g., via a requested RV sequence, etc.), and optionally one or more CQI.

Additionally or alternatively, method 1300 can include one or more other acts described herein in connection with various embodiments of a UE and/or system $400_{UE}$ and the second set of techniques.

Figure 14:
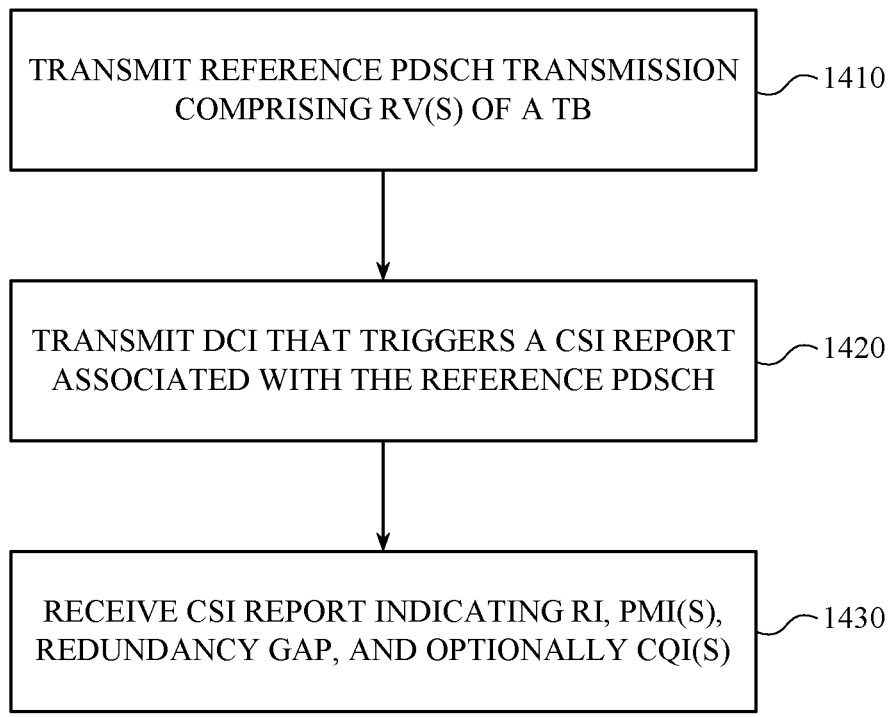
FIG. 14 is a flow diagram illustrating an example method employable at a BS that facilitates reception of CSI feedback based on reference PDSCH that indicates a redundancy gap associated with the PDSCH, according to various embodiments discussed herein.

Referring to FIG. 14, illustrated is a flow diagram of an example method 1400 employable at a BS (e.g., gNB) that facilitates reception of CSI feedback based on reference PDSCH that indicates a redundancy gap associated with the PDSCH, according to various embodiments discussed herein. In other aspects, a machine readable medium can store instructions associated with method 1400 that, when executed, can cause a BS (e.g., employing system $400_{gNB}$, system $400_{eNB}$, etc.) to perform the acts of method 1400.

At 1410, a reference PDSCH transmission of one or more RVs of a TB can be transmitted to a UE.

At 1420, a DCI (e.g., uplink or downlink, as discussed herein) can be transmitted to trigger a CSI report associated with the reference PDSCH (e.g., via explicit indication or implicit association).

At 1430, a CSI report can be received from the UE that indicates a RI, one or more PMIs, a redundancy gap associated with the reference PDSCH (e.g., via a requested RV sequence, etc.), and optionally one or more CQIs.

Additionally or alternatively, method 1400 can include one or more other acts described herein in connection with various embodiments of a BS and/or system $400_{gNB}$, system $400_{eNB}$, etc. and the third set of techniques.

Enhanced ACK/NACK

Various embodiments can employ a third set of techniques, wherein a UE can provide enhanced ACK/NACK feedback as described herein, based on which a receiving BS (e.g., gNB) can determine a number of additional coded bits or amount of additional redundancy based on which the UE can successfully decode a Transport Block.

A UE receives a PDSCH with initial spectral efficiency R (as given by the modulation and coding rate of the MCS).

In existing ACK/NACK feedback, the UE would report ACK/NACK of the PDSCH and network would do retransmissions until the PDSCH is ACK'ed. In a simplified model, ACK will be achieved when $R \leq (I+L(n))$, where I is the instantaneous mutual information over the PDSCH region, and L(n) is the accumulated mutual information from previous n retransmissions.

One problem with this approach is that if the R of initial transmission is far from the current channel conditions, the existing approach can lead to a high number of retransmissions until the gap is bridged.

Also, if the initial transmission is lost or severely affected by strong interference, it can lead to a high number of retransmissions, as the initial transmission carries a large number of systematic bits which take longer to recover if lost.

In various embodiments employing the third set of techniques, parallel to the PDSCH decoding, the UE can extract the DMRS and can compute I. Based at least on I, the UE can compute $D=K(I+L(n)-R)$, where K is a scaling factor, and where D indicates an amount of information sufficient for the UE to successfully complete reception of the TB. An enhanced ACK/NACK feedback (eAN) can be defined as $eAN=D(1-AN)$, with $AN=\{0,1\}$ when CRC is {FAIL, PASS}, respectively (thus, eAN is D when CRC is FAIL, and is 0 when CRC is PASS). In various embodiments employing the third set of techniques, the UE can feedback the eAN in HARQ feedback instead of an ACK/NACK according to existing techniques.

Using eAN, the BS (e.g., gNB) can compute the amount of additional redundancy required for successful decoding, hence the likelihood of ACK after second retransmission is increased as the eAN removes the uncertainty due to aged CSI or external factors affecting the reception of initial transmission.

Also, using eAN, the BS (e.g., gNB) can detect which RVid are received with better/worse conditions, deciding to retransmit the same (or different) RVid as appropriate—the UE can also discard one (re)transmission if the quality of the softbits is too low to avoid corrupting the content in the HARQ.

In various embodiments employing the third set of techniques, $D=K(I+L(n)-R)$, where K is a scaling factor, can be carried as part of CSI feedback. In various such embodiments, D can be normalized by a reference spectral efficiency, for example, a R derived from one of a current MCS level or an initial MCS level, and a quantized version of D/R can be fed back to the network, for example, [D/R×64] with 6 bits to indicate the gap (or ceiling($2^N$×D/R), with N bits to indicate the gap, for some other value of N).

Figure 15:
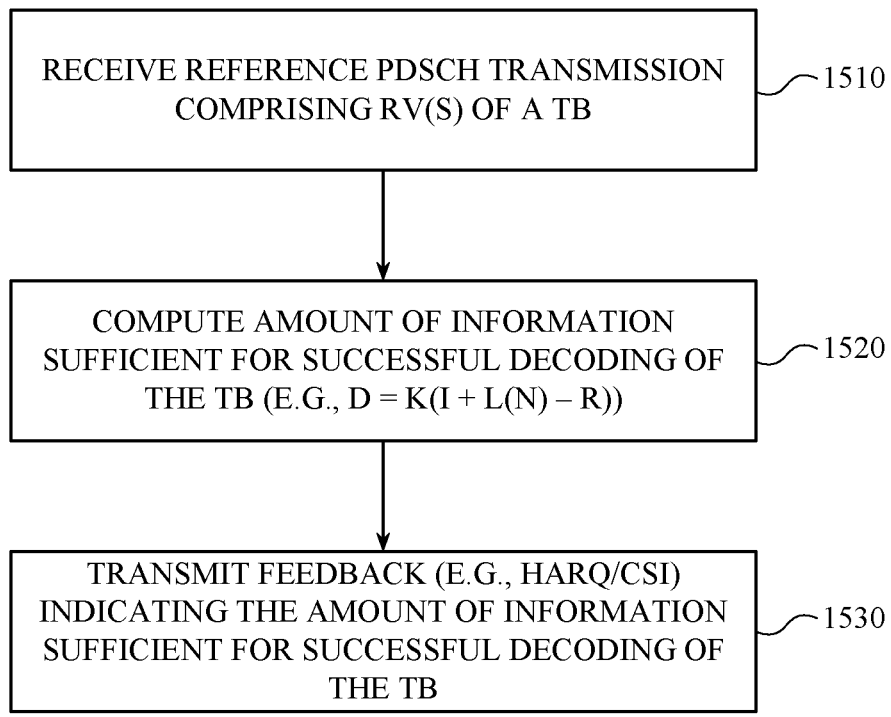
FIG. 15 is a flow diagram illustrating an example method employable at a UE that facilitates generation of enhanced feedback based on PDSCH that facilitates determination by a BS of a redundancy gap associated with the PDSCH, according to various embodiments discussed herein.

Referring to FIG. 15, illustrated is a flow diagram of an example method 1500 employable at a UE that facilitates generation of enhanced feedback based on PDSCH that facilitates determination by a BS of a redundancy gap associated with the PDSCH, according to various embodiments discussed herein. In other aspects, a machine readable medium can store instructions associated with method 1500 that, when executed, can cause a UE (e.g., employing system $400_{UE}$) to perform the acts of method 1500.

At 1510, a reference PDSCH transmission of one or more RVs of a TB can be received from a BS.

At 1520, an amount of information sufficient for the UE to successfully decode the TB (e.g., $D=K(I+L(n)-R)$) can be computed.

At 1530, the amount of information sufficient for the UE to successfully decode the TB (e.g., $D=K(I+L(n)-R)$) can be transmitted to the BS (e.g., via HARQ feedback or CSI feedback).

Additionally or alternatively, method 1500 can include one or more other acts described herein in connection with various embodiments of a UE and/or system $400_{UE}$ and the third set of techniques.

Figure 16:
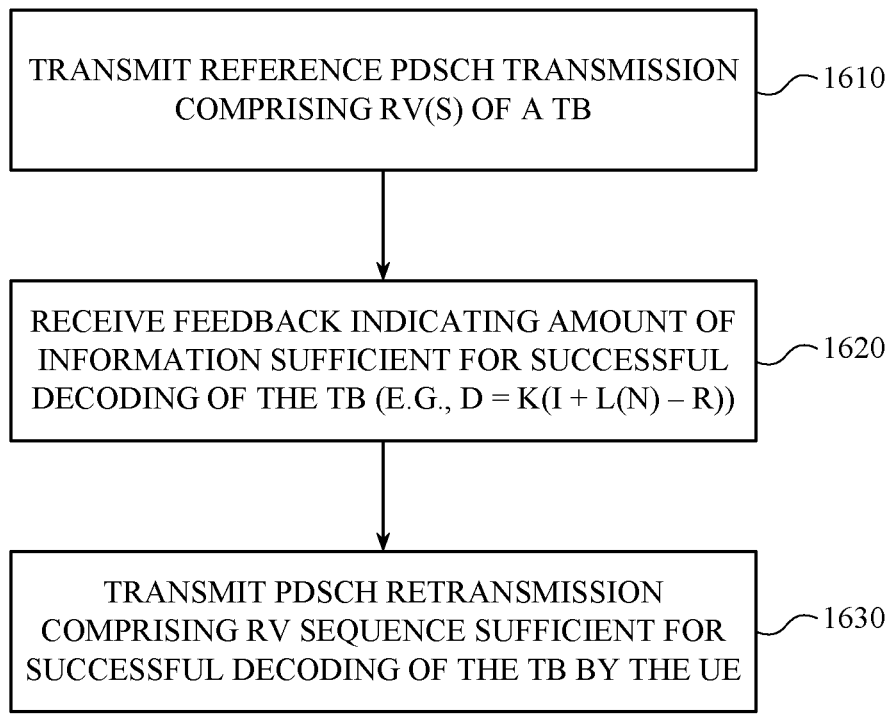
FIG. 16 is a flow diagram illustrating an example method employable at a BS that facilitates determination by a BS of a redundancy gap associated with PDSCH based on enhanced feedback associated with that PDSCH, according to various embodiments discussed herein.

Referring to FIG. 16, illustrated is a flow diagram of an example method 1600 employable at a BS (e.g., gNB) that facilitates determination by a BS of a redundancy gap associated with PDSCH based on enhanced feedback associated with that PDSCH, according to various embodiments discussed herein. In other aspects, a machine readable medium can store instructions associated with method 1600 that, when executed, can cause a BS (e.g., employing system $400_{gNB}$, system $400_{eNB}$, etc.) to perform the acts of method 1600.

At 1610, a reference PDSCH transmission of one or more RVs of a TB can be transmitted to a UE.

At 1620, an amount of information sufficient for the UE to successfully decode the TB (e.g., $D=K(I+L(n)-R)$) can be received (e.g., via HARQ feedback or CSI feedback).

At 1630, one or more additional RVs that can facilitate successful decoding of the TB by the UE can be determined and transmitted.

Additionally or alternatively, method 1600 can include one or more other acts described herein in connection with various embodiments of a BS and/or system $400_{gNB}$, system $400_{eNB}$, etc. and the third set of techniques.

Additional Examples

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a User Equipment (UE), comprising: one or more processors configured to: process an initial Physical Downlink Shared Channel (PDSCH) transmission comprising one or more Redundancy Versions (RVs) of a Transport Block (TB); based at least on the initial PDSCH transmission or retransmission, make a determination of whether the TB was received correctly; and in response to a determination that the TB was not received correctly based on the initial PDSCH transmission or retransmission, generate Hybrid Automatic Repeat reQuest (HARQ) feedback that indicates a requested RV sequence for the TB.

Example 2 comprises the subject matter of any variation of any of example(s) 1, wherein the one or more processors are further configured to process a PDSCH retransmission comprising the requested RV sequence for the TB.

Example 3 comprises the subject matter of any variation of any of example(s) 1, wherein the one or more processors are configured to select the requested RV sequence based at least on a calculation of a number of additional coded bits to decode the TB based on a set of transmission parameters associated with the initial PDSCH transmission or retransmission.

Example 4 comprises the subject matter of any variation of any of example(s) 1-3, wherein the requested RV sequence is indicated based at least on an explicit indication of each RV of the requested RV sequence.

Example 5 comprises the subject matter of any variation of any of example(s) 4, wherein the one or more processors are further configured to select each RV of the requested RV sequence as one of a RV 0, a RV 1, a RV 2, or a RV 3.

Example 6 comprises the subject matter of any variation of any of example(s) 4, wherein the one or more processors are further configured to select each RV of the requested RV sequence as an element of a set of three or fewer of RV 0, a RV 1, a RV 2, or a RV 3.

Example 7 comprises the subject matter of any variation of any of example(s) 1-3, wherein the requested RV sequence is indicated based at least on an indication of a length of a basic RV sequence.

Example 8 comprises the subject matter of any variation of any of example(s) 7, wherein the requested RV sequence is indicated based at least on an indication of a starting RV of a basic RV sequence.

Example 9 comprises the subject matter of any variation of any of example(s) 7-8, wherein the basic RV sequence is predefined.

Example 10 comprises the subject matter of any variation of any of example(s) 7-8, wherein the basic RV sequence is configured via one or more of Radio Resource Control (RRC) signaling or a Medium Access Control (MAC) Control Element (CE).

Example 11 comprises the subject matter of any variation of any of example(s) 1-3, wherein the requested RV sequence is indicated based at least on an indication of a starting RV and an indication of a multiple of a number of coded bits of a reference transmission.

Example 12 is an apparatus configured to be employed in a Base Station (BS), comprising: one or more processors configured to: generate an initial Physical Downlink Shared Channel (PDSCH) transmission comprising one or more Redundancy Versions (RVs) of a Transport Block (TB); process Hybrid Automatic Repeat reQuest (HARQ) feedback that indicates a requested RV sequence for the TB; and generate a PDSCH retransmission that comprises the requested RV sequence for the TB.

Example 13 comprises the subject matter of any variation of any of example(s) 12, wherein the requested RV sequence is indicated based at least on an explicit indication of each RV of the requested RV sequence.

Example 14 comprises the subject matter of any variation of any of example(s) 13, wherein the one or more processors are further configured to select each RV of the requested RV sequence as one of a RV 0, a RV 1, a RV 2, or a RV 3.

Example 15 comprises the subject matter of any variation of any of example(s) 13, wherein the one or more processors are further configured to select each RV of the requested RV sequence as an element of a set of three or fewer of RV 0, a RV 1, a RV 2, or a RV 3.

Example 16 comprises the subject matter of any variation of any of example(s) 12, wherein the requested RV sequence is indicated based at least on an indication of a length of a basic RV sequence.

Example 17 comprises the subject matter of any variation of any of example(s) 16, wherein the requested RV sequence is indicated based at least on an indication of a starting RV of a basic RV sequence.

Example 18 comprises the subject matter of any variation of any of example(s) 16-17, wherein the basic RV sequence is predefined.

Example 19 comprises the subject matter of any variation of any of example(s) 16-17, wherein the one or more processors are further configured to configure the basic RV sequence via one or more of Radio Resource Control (RRC) signaling or a Medium Access Control (MAC) Control Element (CE).

Example 20 comprises the subject matter of any variation of any of example(s) 12, wherein the requested RV sequence is indicated based at least on an indication of a starting RV and an indication of a multiple of a number of coded bits of a reference transmission.

Example 21 is an apparatus configured to be employed in a User Equipment (UE), comprising: one or more processors configured to: process a reference Physical Downlink Shared Channel (PDSCH) transmission comprising one or more Redundancy Versions (RVs) of a Transport Block (TB); process a Downlink Control Information (DCI) that triggers a Channel State Information (CSI) report associated with the reference PDSCH; and generate a CSI report that indicates a Rank Indication (RI), at least one Precoding Matrix Indicator (PMI), and a requested RV sequence for the TB.

Example 22 comprises the subject matter of any variation of any of example(s) 21, wherein the CSI report further indicates at least one Channel Quality Indicator (CQI).

Example 23 comprises the subject matter of any variation of any of example(s) 21-22, wherein the DCI is a downlink DCI that indicates both the reference PDSCH and a set of CSI measurement resources.

Example 24 comprises the subject matter of any variation of any of example(s) 21-22, wherein the DCI is an uplink DCI, and wherein the reference PDSCH is a most recent PDSCH prior to a transmission of the CSI report.

Example 25 comprises the subject matter of any variation of any of example(s) 21-22, wherein the DCI is an uplink DCI, and wherein the reference PDSCH is a most recent PDSCH prior to the DCI.

Example 26 comprises the subject matter of any variation of any of example(s) 21-22, wherein the DCI comprises one or more of a priority indication or a traffic type indication that indicates the reference PDSCH.

Example 27 comprises the subject matter of any variation of any of example(s) 21-26, wherein the requested RV sequence is indicated based at least on an explicit indication of each RV of the requested RV sequence.

Example 28 comprises the subject matter of any variation of any of example(s) 27, wherein the one or more processors are further configured to select each RV of the requested RV sequence as one of a RV 0, a RV 1, a RV 2, or a RV 3.

Example 29 comprises the subject matter of any variation of any of example(s) 27, wherein the one or more processors are further configured to select each RV of the requested RV sequence as an element of a set of three or fewer of RV 0, a RV 1, a RV 2, or a RV 3.

Example 30 comprises the subject matter of any variation of any of example(s) 21-26, wherein the requested RV sequence is indicated based at least on an indication of a length of a basic RV sequence.

Example 31 comprises the subject matter of any variation of any of example(s) 30, wherein the requested RV sequence is indicated based at least on an indication of a starting RV of a basic RV sequence.

Example 32 comprises the subject matter of any variation of any of example(s) 30, wherein the basic RV sequence is predefined.

Example 33 comprises the subject matter of any variation of any of example(s) 30, wherein the one or more processors are further configured to configure the basic RV sequence via one or more of Radio Resource Control (RRC) signaling or a Medium Access Control (MAC) Control Element (CE).

Example 34 comprises the subject matter of any variation of any of example(s) 21-26, wherein the requested RV sequence is indicated based at least on an indication of a starting RV and an indication of a multiple of a number of coded bits of a reference transmission.

Example 35 is an apparatus configured to be employed in a next generation Node B (gNB), comprising: one or more processors configured to: generate a reference Physical Downlink Shared Channel (PDSCH) transmission comprising one or more Redundancy Versions (RVs) of a Transport Block (TB); generate a Downlink Control Information (DCI) that triggers a Channel State Information (CSI) report associated with the reference PDSCH; and process a CSI report that indicates a Rank Indication (RI), at least one Precoding Matrix Indicator (PMI), and a requested RV sequence for the TB.

Example 36 comprises the subject matter of any variation of any of example(s) 35, wherein the CSI report further indicates at least one Channel Quality Indicator (CQI).

Example 37 comprises the subject matter of any variation of any of example(s) 35-36, wherein the DCI is a downlink DCI that indicates both the reference PDSCH and a set of CSI measurement resources.

Example 38 comprises the subject matter of any variation of any of example(s) 35-36, wherein the DCI is an uplink DCI, and wherein the reference PDSCH is a most recent PDSCH prior to a transmission of the CSI report.

Example 39 comprises the subject matter of any variation of any of example(s) 35-36, wherein the DCI is an uplink DCI, and wherein the reference PDSCH is a most recent PDSCH prior to the DCI.

Example 40 comprises the subject matter of any variation of any of example(s) 35-36, wherein the DCI comprises one or more of a priority indication or a traffic type indication that indicates the reference PDSCH.

Example 41 comprises the subject matter of any variation of any of example(s) 35-40, wherein the requested RV sequence is indicated based at least on an explicit indication of each RV of the requested RV sequence.

Example 42 comprises the subject matter of any variation of any of example(s) 41, wherein the one or more processors are further configured to select each RV of the requested RV sequence as one of a RV 0, a RV 1, a RV 2, or a RV 3.

Example 43 comprises the subject matter of any variation of any of example(s) 41, wherein the one or more processors are further configured to select each RV of the requested RV sequence as an element of a set of three or fewer of RV 0, a RV 1, a RV 2, or a RV 3.

Example 44 comprises the subject matter of any variation of any of example(s) 35-40, wherein the requested RV sequence is indicated based at least on an indication of a length of a basic RV sequence.

Example 45 comprises the subject matter of any variation of any of example(s) 44, wherein the requested RV sequence is indicated based at least on an indication of a starting RV of a basic RV sequence.

Example 46 comprises the subject matter of any variation of any of example(s) 44, wherein the basic RV sequence is predefined.

Example 47 comprises the subject matter of any variation of any of example(s) 44, wherein the one or more processors are further configured to configure the basic RV sequence via one or more of Radio Resource Control (RRC) signaling or a Medium Access Control (MAC) Control Element (CE).

Example 48 comprises the subject matter of any variation of any of example(s) 35-40, wherein the requested RV sequence is indicated based at least on an indication of a starting RV and an indication of a multiple of a number of coded bits of a reference transmission.

Example 49 is an apparatus configured to be employed in a User Equipment (UE), comprising: one or more processors configured to: process a reference Physical Downlink Shared Channel (PDSCH) transmission comprising one or more Redundancy Versions (RVs) of a Transport Block (TB); compute an amount of additional information sufficient for successful decoding of the TB; and generate feedback indicating the amount of additional information sufficient for successful decoding of the TB.

Example 50 comprises the subject matter of any variation of any of example(s) 49, wherein the feedback is Hybrid Automatic Repeat reQuest (HARQ) feedback.

Example 51 comprises the subject matter of any variation of any of example(s) 49, wherein the feedback is Channel State Information (CSI) feedback.

Example 52 comprises the subject matter of any variation of any of example(s) 49-51, wherein the feedback indicates the amount of additional information sufficient for successful decoding of the TB as a quantized ratio of the amount of additional information sufficient for successful decoding of the TB relative to a reference spectral efficiency.

Example 53 is an apparatus configured to be employed in a User Equipment (UE), comprising: one or more processors configured to: generate a reference Physical Downlink Shared Channel (PDSCH) transmission comprising one or more Redundancy Versions (RVs) of a Transport Block (TB); receive feedback indicating an amount of additional information sufficient for successful decoding of the TB; and generate, based at least on the feedback, one or more additional RVs of the TB.

Example 54 comprises the subject matter of any variation of any of example(s) 53, wherein the feedback is Hybrid Automatic Repeat reQuest (HARQ) feedback.

Example 55 comprises the subject matter of any variation of any of example(s) 53, wherein the feedback is Channel State Information (CSI) feedback.

Example 56 comprises the subject matter of any variation of any of example(s) 53-55, wherein the feedback indicates the amount of additional information sufficient for successful decoding of the TB as a quantized ratio of the amount of additional information sufficient for successful decoding of the TB relative to a reference spectral efficiency.

Example 57 comprises an apparatus comprising means for executing any of the described operations of examples 1-56.

Example 58 comprises a machine readable medium that stores instructions for execution by a processor to perform any of the described operations of examples 1-56.

Example 59 comprises an apparatus comprising: a memory interface; and processing circuitry configured to: perform any of the described operations of examples 1-56.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a User Equipment (UE), comprising:
one or more processors configured to:
process an initial Physical Downlink Shared Channel (PDSCH) transmission comprising one or more Redundancy Versions (RVs) of a Transport Block (TB);
based at least on the initial PDSCH transmission, make a determination of whether the TB was received correctly; and
in response to a determination that the TB was not received correctly, generate Hybrid Automatic Repeat reQuest (HARQ) feedback that indicates a requested RV sequence for the TB, wherein the requested RV sequence is indicated based at least on an indication of a length of a basic RV sequence.

2. The apparatus of claim 1, wherein the one or more processors are further configured to process a PDSCH retransmission comprising the requested RV sequence for the TB.

3. The apparatus of claim 1, wherein the one or more processors are configured to select the requested RV sequence based at least on a calculation of a number of additional coded bits to decode the TB based on a set of transmission parameters associated with the initial PDSCH transmission or retransmission.

4. The apparatus of claim 1, wherein the requested RV sequence is indicated based at least on an explicit indication of each RV of the requested RV sequence.

5. The apparatus of claim 4, wherein the one or more processors are further configured to select each RV of the requested RV sequence as one of a RV 0, a RV 1, a RV 2, or a RV 3.

6. The apparatus of claim 4, wherein the one or more processors are further configured to select each RV of the requested RV sequence as an element of a set of three or fewer of RV 0, a RV 1, a RV 2, or a RV 3.

7. The apparatus of claim 1, wherein the requested RV sequence is indicated based at least on an indication of a starting RV of a basic RV sequence.

8. The apparatus of claim 1, wherein the basic RV sequence is predefined.

9. The apparatus of claim 1, wherein the basic RV sequence is configured via one or more of Radio Resource Control (RRC) signaling or a Medium Access Control (MAC) Control Element (CE).

10. The apparatus of claim 1, wherein the requested RV sequence is indicated based at least on an indication of a starting RV and an indication of a multiple of a number of coded bits of a reference transmission.

11. The apparatus of claim 1, wherein the requested RV sequence in the HARQ feedback includes multiple RVs to be transmitted at different times within the requested RV sequence.

12. An apparatus configured to be employed in a Base Station (BS), comprising:
one or more processors configured to:
generate an initial Physical Downlink Shared Channel (PDSCH) transmission comprising one or more Redundancy Versions (RVs) of a Transport Block (TB);
process Hybrid Automatic Repeat reQuest (HARQ) feedback that indicates a requested RV sequence for the TB, the requested RV sequence in the HARQ feedback including multiple RVs to be transmitted at different times within the requested RV sequence, wherein the requested RV sequence is indicated based at least on an indication of a length of a basic RV sequence; and
generate a PDSCH retransmission that comprises the requested RV sequence for the TB.

13. The apparatus of claim 12, wherein the requested RV sequence is indicated based at least on an indication of a starting RV and an indication of a multiple of a number of coded bits of a reference transmission.

14. An apparatus configured to be employed in a User Equipment (UE), comprising:
one or more processors configured to:
process a reference Physical Downlink Shared Channel (PDSCH) transmission comprising one or more Redundancy Versions (RVs) of a Transport Block (TB);
process a Downlink Control Information (DCI) that triggers a Channel State Information (CSI) report associated with the reference PDSCH transmission; and
generate a CSI report that indicates a Rank Indication (RI), at least one Precoding Matrix Indicator (PMI), and a requested RV sequence for the TB, the requested RV sequence including multiple RVs to be transmitted at different times within the requested RV sequence.

15. The apparatus of claim 14, wherein the CSI report further indicates at least one Channel Quality Indicator (COI).

16. The apparatus of claim 14, wherein the DCI is a downlink DCI that indicates both the reference PDSCH transmission and a set of CSI measurement resources.

17. The apparatus of claim 14, wherein the DCI is an uplink DCI, and wherein the reference PDSCH transmission is a most recent PDSCH transmission prior to a transmission of the CSI report.

18. The apparatus of claim 14, wherein the DCI is an uplink DCI, and wherein the reference PDSCH transmission is a most recent PDSCH transmission prior to the DCI.

19. The apparatus of claim 14, wherein the DCI comprises one or more of a priority indication or a traffic type indication that indicates the reference PDSCH transmission.

20. The apparatus of claim 14, wherein the requested RV sequence is indicated based at least on an explicit indication of each RV of the requested RV sequence.

* * * * *